US011483180B2

(12) United States Patent
Li et al.

(10) Patent No.: US 11,483,180 B2
(45) Date of Patent: Oct. 25, 2022

(54) CONFIGURATION OF SOUNDING REFERENCE SIGNAL RESOURCE FOR MULTI-PANEL UPLINK TRANSMISSION

(71) Applicants: Qualcomm Incorporated, San Diego, CA (US); Qiaoyu Li, Beijing (CN); Yu Zhang, Beijing (CN); Chao Wei, Beijing (CN); Chenxi Hao, Beijing (CN); Liangming Wu, Beijing (CN); Hao Xu, Beijing (CN)

(72) Inventors: Qiaoyu Li, Beijing (CN); Yu Zhang, Beijing (CN); Chao Wei, Beijing (CN); Chenxi Hao, Beijing (CN); Liangming Wu, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/259,207

(22) PCT Filed: Jul. 23, 2019

(86) PCT No.: PCT/CN2019/097207
§ 371 (c)(1),
(2) Date: Jan. 11, 2021

(87) PCT Pub. No.: WO2020/020120
PCT Pub. Date: Jan. 30, 2020

(65) Prior Publication Data
US 2021/0281448 A1 Sep. 9, 2021

(51) Int. Cl.
*H04L 25/02* (2006.01)
*H04B 7/0404* (2017.01)
(Continued)

(52) U.S. Cl.
CPC ....... *H04L 25/0226* (2013.01); *H04B 7/0404* (2013.01); *H04B 7/0456* (2013.01);
(Continued)

(58) Field of Classification Search
CPC . H04L 25/0226; H04L 5/0051; H04L 5/0091; H04L 5/0023; H04L 5/0058;
(Continued)

(56) References Cited

U.S. PATENT DOCUMENTS

| 11,233,676 B2* | 1/2022 | Zhang ................. H04L 25/0226 |
| 2019/0174527 A1* | 6/2019 | Park ..................... H04L 25/0224 |
| 2020/0177416 A1 | 6/2020 | Jiang et al. |

FOREIGN PATENT DOCUMENTS

| CA | 3035000 A1 | 3/2018 |
| CN | 103220794 A | 7/2013 |

(Continued)

OTHER PUBLICATIONS

International Search Report and Written Opinion—PCT/CN2019/097207—ISA/EPO—dated Oct. 22, 2019.
(Continued)

*Primary Examiner* — Thai Nguyen
(74) *Attorney, Agent, or Firm* — Holland & Hart LLP

(57) ABSTRACT

A base station may determine co-phase information and uplink precoding information (e.g., user equipment (UE) precoder information) based on one or more received sounding reference signals (SRSs) from a UE. The UE may adjust precoders or co-phase for different SRS transmissions over the one or more configured SRS resources. As such, the base station may indicate either co-phase information or uplink precoding information via an SRS resource indicator (SRI), and may transmit an explicit indication of the remaining co-phase information or uplink precoding information in addition to the SRI. In other examples (e.g., when only a single SRS resource is configured), the base station may transmit an index corresponding to uplink precoding information, as well as a separate indication of co-phase information. In some cases, a port selection pattern may be (Continued)

included with an explicit indication, indicating a selection of antenna port indices the precoder or co-phase index applies to.

30 Claims, 18 Drawing Sheets

(51) Int. Cl.
*H04B 7/0456* (2017.01)
*H04L 5/00* (2006.01)
*H04W 8/24* (2009.01)
*H04W 72/04* (2009.01)

(52) U.S. Cl.
CPC ............ *H04L 5/0051* (2013.01); *H04W 8/24* (2013.01); *H04W 72/0413* (2013.01)

(58) Field of Classification Search
CPC ... H04L 25/024; H04B 7/0404; H04B 7/0456; H04B 7/02; H04B 7/06; H04W 8/24; H04W 72/0413
See application file for complete search history.

(56) References Cited

FOREIGN PATENT DOCUMENTS

| | | |
|---|---|---|
| CN | 107733496 A | 2/2018 |
| CN | 108111253 A | 6/2018 |
| CN | 108111272 A | 6/2018 |
| CN | 108111283 A | 6/2018 |
| WO | WO-2018031869 A1 | 2/2018 |
| WO | WO-2018132781 A1 | 7/2018 |
| WO | WO-2019032855 A1 * | 2/2019 ........... H04B 7/0408 |

OTHER PUBLICATIONS

International Search Report and Written Opinion—PCT/CN2018/096696—ISA/EPO—dated Apr. 24, 2019.
LG Electronics: "Discussion on Codebook based Transmission for UL in NR," R1-1702447, 3GPP TSG RAN WG1 Meeting#88, Athens, Greece Feb. 13-17, 2017, 7 pages.
Supplementary European Search Report—EP19840850—Search Authority—The Hague—dated May 2, 2022.

* cited by examiner

CONFIGURATION OF SOUNDING REFERENCE SIGNAL RESOURCE FOR MULTI-PANEL UPLINK TRANSMISSION

CROSS REFERENCES TO RELATED APPLICATIONS

The present application for patent claims priority to International Patent Application No. PCT/CN2019/097207 by Li et al., entitled "CONFIGURATION OF SOUNDING REFERENCE SIGNAL RESOURCE FOR MULTI-PANEL UPLINK TRANSMISSION," filed Jul. 23, 2019; and to International Patent Application No. PCT/CN2018/096696 by Li et al., entitled "CONFIGURATION OF SOUNDING REFERENCE SIGNAL RESOURCE FOR MULTI-PANEL UPLINK TRANSMISSION," filed Jul. 23, 2018, each of which is assigned to the assignee hereof and each of which is hereby incorporated by reference in its entirety.

BACKGROUND

The following relates generally to wireless communications, and more specifically to configuration of sounding reference signal (SRS) resource(s) for multi-panel uplink transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may support multiple-input, multiple-output (MIMO) communications (e.g., where communicating devices may be equipped with multiple antennas such that communications may employ multipath signal propagation). In some cases, MIMO communications may rely on transmissions of reference signals (e.g., sounding reference signals (SRSs)) over one or more antenna ports. Further, devices may store codebooks or lookup tables including, for example, uplink transmission parameters (e.g., uplink precoding information, co-phase information, a combination of beams for communication, etc.). For example, to indicate uplink transmission parameters, a base station may receive and evaluate a reference signal from a UE. The base station may then indicate an index associated with the codebook to the UE (e.g., and the UE may lookup uplink parameters accordingly). In some cases, this may result in latency arising from lookup procedures, memory storage burdens, overhead associated with codebook index signaling, etc.

SUMMARY

The described techniques relate to improved methods, systems, devices, and apparatuses that support configuration of sounding reference signal (SRS) resource(s) for multi-panel uplink transmission. Generally, the described techniques provide for SRS configuration in wireless communications systems supporting multi-panel uplink transmissions for determination of uplink precoding and co-phase information.

A user equipment (UE) may transmit a UE capability report to a base station indicating a number of SRS resources the UE is capable of transmitting over, a number of antenna ports the UE is capable of using for each SRS resource (e.g., for each SRS transmission), coherency capabilities between different antenna ports, etc. The base station may configure one or more SRS resources based at least in part on the capabilities of the UE, as indicated in the UE capability report. For example, the base station may configure three SRS resources, and each SRS resource may be associated with (e.g., or configured with) one or more antenna ports. The UE may then transmit SRSs according to the SRS configuration. In the above example, the UE may transmit three SRSs, one over each SRS resource, and each SRS may be transmitted using an antenna port configuration indicated by the SRS resource configuration.

The base station may determine co-phase information and uplink precoding information (e.g., UE precoder information) based on the one or more received SRSs. In some examples, the UE may identify co-phase adjustments for the one or more SRS resources, and may transmit the one or more SRSs according to the identified co-phase adjustments (e.g., where the co-phase may be adjusted from one SRS to the next). In such cases, the base station may indicate co-phase information via an SRS resource indicator (SRI) that indicates an SRS resource corresponding to one of the received SRS transmissions (e.g., as the SRI may implicitly indicate a co-phase adjustment used by the UE for the SRS transmission on the indicated SRS resource). In such cases, the base station may transmit an explicit indication of uplink precoding information (e.g., such as a transmitted precoding matrix indicator (TPMI) or other explicit indication or index of uplink precoding information and number of layers) in addition to the SRI. In other examples, the UE may identify precoder adjustments for the one or more SRS resources, and may transmit the one or more SRSs according to the identified precoder adjustments (e.g., where the precoder may be adjusted from one SRS to the next). In such cases, the base station may indicate uplink precoding information via an SRI that indicates an SRS resource corresponding to one of the received SRS transmissions (e.g., as the SRI may implicitly indicate a co-phase adjustment used by the UE for the SRS transmission on the indicated SRS resource). In such cases, the base station may transmit an explicit indication of co-phase information in addition to the SRI. In yet other examples (e.g., when only a single SRS resource is configured), the base station may transmit explicit indications of uplink precoding information and co-phase information (e.g., the base station may transmit TPMI to convey uplink precoding information, and a separate indication of co-phase may also be transmitted).

The UE may receive the uplink precoding indication and the co-phase information indication (e.g., via SRI and explicit indications), and may adjust SRS transmission parameters accordingly. For example, the UE may determine, based on the uplink precoding information, a precoding matrix, a number of physical uplink shared channel (PUSCH) transmission layers, a selection of a subset of antenna ports for PUSCH transmission, etc. In some cases, uplink precoding information indications and/or co-phase information indications may refer to explicit indications of indices, and the UE may reference a codebook or other lookup table using the index to obtain the uplink precoding information indications and/or co-phase information. According to additional aspects of the present disclosure, explicit uplink precoding information indications (e.g., TPMI) may include a precoder port selection pattern to account for the multiple panels that may be employed. For example, precoder port selection patterns may indicate antenna port indices (e.g., such that certain panels or subsets of the panels may be selected). As such, explicit uplink precoding information indications may be sent for different panels or subsets of the panels.

A method of wireless communication at a UE is described. The method may include receiving, from a base station, an SRS resource configuration for one or more SRS resources and transmitting, to the base station, one or more SRSs based on the SRS resource configuration. The method may further include receiving, from a base station, an SRS resource indication (SRI) indicating a selected SRS resource of the one or more SRS resources based at least in part on the one or more transmitted SRSs. The method may further include receiving, from the base station, at least one of an uplink precoding information indication and a co-phase information indication based on the one or more transmitted SRSs, the uplink precoding information indication and the co-phase information indication being included with the SRI or with a transmitted precoding matrix indicator (TPMI). The method may further include adjusting SRS transmission parameters based at least on the uplink precoding information indication and the co-phase information indication.

An apparatus for wireless communication at a UE is described. The apparatus may include a processor, memory coupled with the processor, and instructions stored in the memory. The instructions may be executable by the processor to cause the apparatus to receive, from a base station, an SRS resource configuration for one or more SRS resources, and transmit, to the base station, one or more SRSs based on the SRS resource configuration. The instructions may be executable by the processor to further cause the apparatus to receive, from a base station, an SRS resource indication (SRI) indicating a selected SRS resource of the one or more SRS resources based at least in part on the one or more transmitted SRSs. The instructions may be executable by the processor to further cause the apparatus to receive, from the base station, at least one of an uplink precoding information indication and a co-phase information indication based on the one or more transmitted SRSs, the uplink precoding information indication and the co-phase information indication being included with the SRI or with a transmitted precoding matrix indicator (TPMI), and adjust SRS transmission parameters based at least on the uplink precoding information indication and the co-phase information indication.

Another apparatus for wireless communication at a UE is described. The apparatus may include means for receiving, from a base station, an SRS resource configuration for one or more SRS resources, and transmitting, to the base station, one or more SRSs based on the SRS resource configuration. The apparatus may further include means for receiving, from the base station, an SRS resource indication (SRI) indicating a selected SRS resource of the one or more SRS resources based at least in part on the one or more transmitted SRSs. The apparatus may include further means for receiving, from the base station, at least one of an uplink precoding information indication and a co-phase information indication based on the one or more transmitted SRSs, the uplink precoding information indication and the co-phase information indication being included with the SRI or with a transmitted precoding matrix indicator (TPMI), and adjusting SRS transmission parameters based at least on the uplink precoding information indication and the co-phase information indication.

A non-transitory computer-readable medium storing code for wireless communication at a UE is described. The code may include instructions executable by a processor to receive, from a base station, an SRS resource configuration for one or more SRS resources, and transmit, to the base station, one or more SRSs based on the SRS resource configuration. The code may include instructions further executable by a processor to receive, from the base station, an SRS resource indication (SRI) indicating a selected SRS resource of the one or more SRS resources based at least in part on the one or more transmitted SRSs. The code may include instructions further executable by a processor to receive, from the base station, at least one of an uplink precoding information indication and a co-phase information indication based on the one or more transmitted SRSs, the uplink precoding information indication and the co-phase information indication being included with the SRI or with a transmitted precoding matrix indicator (TPMI), and adjust SRS transmission parameters based at least on the uplink precoding information indication and the co-phase information indication.

In some examples of the method, apparatuses, and non-transitory computer-readable medium described herein, transmitting the one or more SRSs based on the SRS resource configuration further may include operations, features, means, or instructions for identifying a co-phase adjustment for each of the one or more SRS resources and transmitting the one or more SRSs based on the identified co-phase adjustments.

In some examples of the method, apparatuses, and non-transitory computer-readable medium described herein, receiving the co-phase information indication may include operations, features, means, or instructions for receiving an SRI indicating a selected SRS resource of the one or more SRS resources based on the one or more transmitted SRSs, where the co-phase information indication includes the co-phase adjustment associated with the selected SRS resource indicated by the SRI.

Some examples of the method, apparatuses, and non-transitory computer-readable medium described herein may further include operations, features, means, or instructions for determining, based on the uplink precoding information indication, a precoding matrix, a number of PUSCH transmission layers, a selection of a subset of antenna ports for PUSCH transmission, or some combination thereof. In some examples of the method, apparatuses, and non-transitory computer-readable medium described herein, the uplink precoding information indication includes a precoder port selection pattern indicating the selection of the subset of antenna ports for PUSCH transmission.

In some examples of the method, apparatuses, and non-transitory computer-readable medium described herein, transmitting the one or more SRSs based on the SRS resource configuration further may include operations, features, means, or instructions for identifying a precoder adjustment for each of the one or more SRS resources and transmitting the one or more SRSs based on the identified precoder adjustments.

In some examples of the method, apparatuses, and non-transitory computer-readable medium described herein, receiving the uplink precoding information indication may include operations, features, means, or instructions for receiving an SRI indicating a selected SRS resource of the one or more SRS resources based on the one or more transmitted SRSs, where the uplink precoding information indication includes the precoder adjustment associated with the selected SRS resource indicated by the SRI.

Some examples of the method, apparatuses, and non-transitory computer-readable medium described herein may further include operations, features, means, or instructions for determining, based on the SRI, a number of PUSCH transmission layers, where the number of PUSCH transmission layers may be equal to the number of SRS resources indicated in the SRI.

Some examples of the method, apparatuses, and non-transitory computer-readable medium described herein may further include operations, features, means, or instructions for transmitting a UE capability report indicating a number of SRS resources capability, a number of SRS ports supported per SRS resource capability, an antenna port coherency capability, or some combination thereof, where the SRS resource configuration may be based on the transmitted UE capability report.

In some examples of the method, apparatuses, and non-transitory computer-readable medium described herein, the uplink precoding information indication includes an index of uplink precoding information and number of layers. In some examples of the method, apparatuses, and non-transitory computer-readable medium described herein, each SRS resource of the one or more SRS resources includes a set of antenna ports. In some examples of the method, apparatuses, and non-transitory computer-readable medium described herein, the uplink precoding information indication further indicates a number of layers.

A method of wireless communication at a base station is described. The method may include transmitting, to a UE, an SRS resource configuration for one or more SRS resources, and receiving, from the UE, one or more SRSs based on the SRS resource configuration. The method may further include transmitting an SRS resource indication (SRI) indicating a selected SRS resource of the one or more SRS resources based at least in part on the one or more transmitted SRSs. The method may further include transmitting, to the UE, at least one of an uplink precoding information indication and a co-phase information indication based on the one or more SRSs, the uplink precoding information indication and the co-phase information indication being included with the SRI or whit a transmitted precoding matrix indicator (TPMI).

An apparatus for wireless communication at a base station is described. The apparatus may include a processor, memory coupled with the processor, and instructions stored in the memory. The instructions may be executable by the processor to cause the apparatus to transmit, to a UE, an SRS resource configuration for one or more SRS resources, and receive, from the UE, one or more SRSs based on the SRS resource configuration. The instructions may be executable by the processor to further cause the apparatus to transmit an SRS resource indication (SRI) indicating a selected SRS resource of the one or more SRS resources based at least in part on the one or more transmitted SRSs. The instructions may be executable by the processor to further cause the apparatus to transmit, to the UE, at least one of an uplink precoding information indication and a co-phase information indication based on the one or more SRSs, the uplink precoding information indication and the co-phase information indication being included with the SRI or whit a transmitted precoding matrix indicator (TPMI).

Another apparatus for wireless communication at a base station is described. The apparatus may include means for transmitting, to a UE, an SRS resource configuration for one or more SRS resources, receiving, from the UE, one or more SRSs based on the SRS resource configuration, transmitting an SRS resource indication (SRI) indicating a selected SRS resource of the one or more SRS resources based at least in part on the one or more transmitted SRSs, and transmitting, to the UE, at least one of an uplink precoding information indication and a co-phase information indication based on the one or more SRSs, the uplink precoding information indication and the co-phase information indication being included with the SRI or whit a transmitted precoding matrix indicator (TPMI).

A non-transitory computer-readable medium storing code for wireless communication at a base station is described. The code may include instructions executable by a processor to transmit, to a UE, an SRS resource configuration for one or more SRS resources, receive, from the UE, one or more SRSs based on the SRS resource configuration, transmit an SRS resource indication (SRI) indicating a selected SRS resource of the one or more SRS resources based at least in part on the one or more transmitted SRSs, and transmit, to the UE, at least one of an uplink precoding information indication and a co-phase information indication based on the one or more SRSs, the uplink precoding information indication and the co-phase information indication being included with the SRI or whit a transmitted precoding matrix indicator (TPMI).

In some examples of the method, apparatuses, and non-transitory computer-readable medium described herein, transmitting the co-phase information indication further may include operations, features, means, or instructions for determining a co-phase for each of the SRS resources based on the one or more received SRSs, selecting an SRS resource based on the co-phase associated with the selected SRS resource and transmitting an SRI indicating the selected SRS resource, where the co-phase information indication includes the SRI.

In some examples of the method, apparatuses, and non-transitory computer-readable medium described herein, transmitting the uplink precoding information indication further may include operations, features, means, or instructions for selecting a group of UE antenna ports based on the one or more received SRSs, identifying a precoder port selection pattern based on the selecting and transmitting the uplink precoding information indication, where the uplink precoding information indication includes the identified precoder port selection pattern.

In some examples of the method, apparatuses, and non-transitory computer-readable medium described herein, transmitting the uplink precoding information indication further may include operations, features, means, or instructions for selecting an SRS resource based on the one or more received SRS and transmitting an SRI indicating the selected SRS resource, where the uplink precoding information indication includes the SRI.

Some examples of the method, apparatuses, and non-transitory computer-readable medium described herein may further include operations, features, means, or instructions for receiving a UE capability report indicating a number of SRS resources capability, a number of SRS ports supported per SRS resource capability, an antenna port coherency capability, or some combination thereof and identifying the SRS resource configuration based on the received UE capability report.

In some examples of the method, apparatuses, and non-transitory computer-readable medium described herein, the uplink precoding information indication includes an index of uplink precoding information and number of layers. In some examples of the method, apparatuses, and non-transitory computer-readable medium described herein, each SRS resource of the one or more SRS resources includes a set of antenna ports. In some examples of the method, apparatuses, and non-transitory computer-readable medium described herein, the uplink precoding information indication further indicates a number of layers.

DETAILED DESCRIPTION

Figure 1:
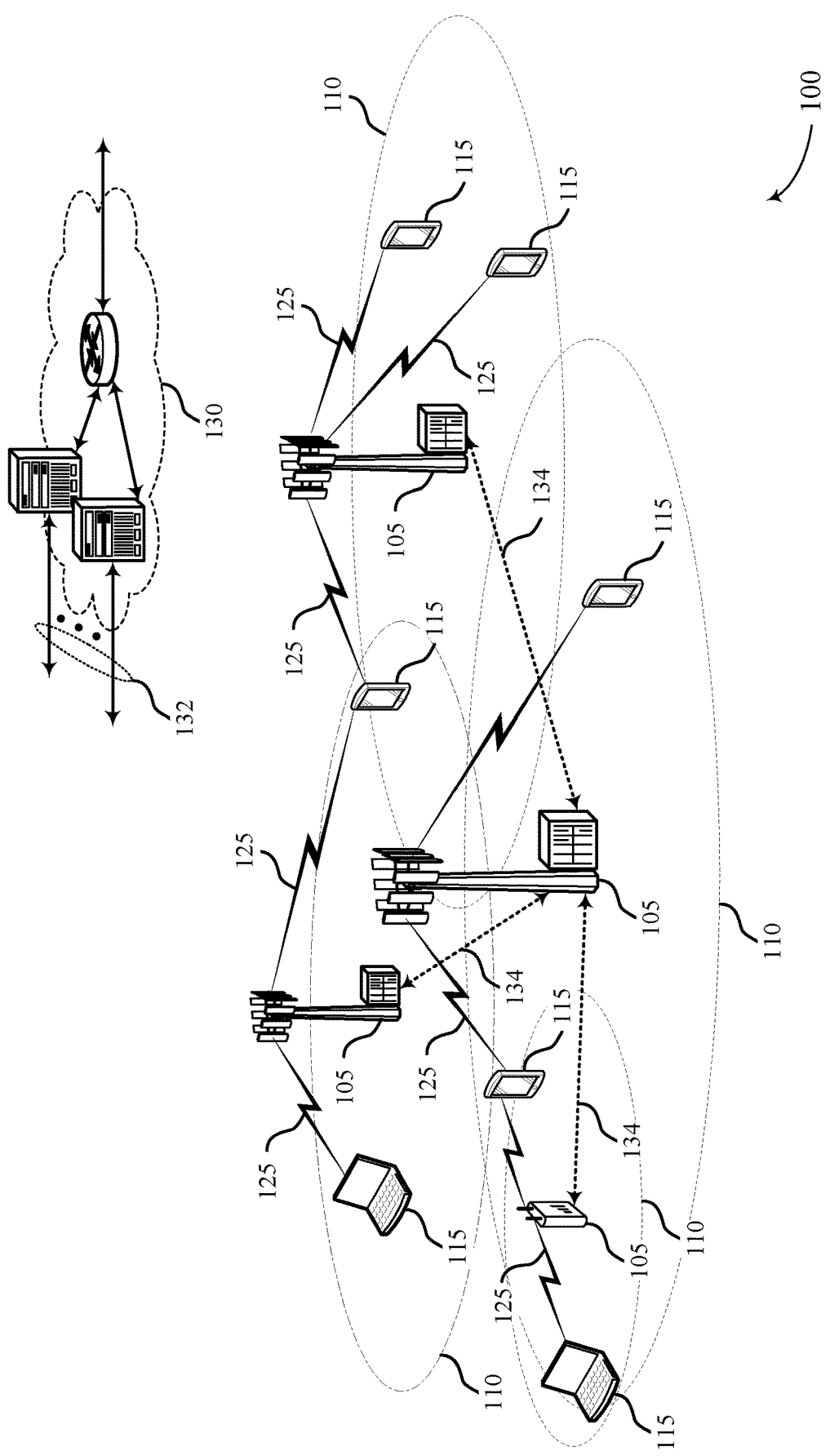
FIG. 1 illustrates an example of a system for wireless communications that supports configuration of sounding reference signal (SRS) resource(s) for multi-panel uplink transmission in accordance with aspects of the present disclosure.

In some wireless communications systems, wireless devices (e.g., base stations and user equipments (UEs)) may be equipped with multiple antenna elements (e.g., antenna ports), which may be used to employ techniques such as transmit diversity, receive diversity, multiple-input multiple-output (MIMO) communications, and beamforming. In cases where both the transmitter and the receiver both have multiple antennas, multiple parallel data streams may be set up to increase the data rate and/or improve the reliability of communications. For example, multiple signals may be transmitted by the transmitting device via different antenna ports or different combinations of antenna elements. Likewise, the multiple signals may be received by the receiving device via different antenna ports or different combinations of antenna elements. Each of the multiple signals may be referred to as a separate spatial stream, and may carry bits associated with a same data stream (e.g., for transmit diversity) or different data streams (e.g., for spatial multiplexing). Different spatial layers may be associated with different antenna ports. Further, communications over different antenna ports may be associated with varying performance, depending on the channel conditions.

In some cases, a base station may provide a UE with an indication as to the number of spatial layers to transmit, as well as a precoding to apply (e.g., an antenna port configuration selection, or antenna port precoder weighting), based on observed channel conditions (e.g., such as channel state information (CSI)). In some examples, a base station may determine such spatial layering and precoding information based on CSI observed or identified from uplink reference signals (e.g., sounding reference signals (SRS)) transmitted by the UE over one or more antenna ports and using one or more transmission layers.

For example, some wireless communication systems may utilize codebook-based transmission schemes, where a UE may transmit a single SRS resource and a base station may select a transmitted precoding matrix indicator (TPMI) which may specify the number of spatial layers and the precoding information (e.g., a set of precoding weights at the UE). The base station may transmit TPMI to the UE, and the UE may refer to a codebook index associated with the TPMI to identify, for example, a number of spatial layers to transmit as well as precoding information. In other examples, wireless communications systems may utilize non-codebook-based transmission schemes, where an SRS resource may be configured for each antenna port and the base station may transmit an SRS resource indication (SRI) to the UE indicating the SRS resource associated with a preferred SRS transmission. For example, the base station may configure a UE to transmit over multiple SRS resources, and the UE may transmit SRS with varied antenna port configurations using different numbers of transmission layers. The base station may obtain uplink CSI from the multiple received SRS, and may transmit an SRI to the UE. The UE may identify the number of spatial layers and the precoding information based on the antenna port, precoding, etc. associated with the SRS transmission corresponding to the SRI.

However, as base stations and UEs are designed with, and capable of employing, increasing numbers of antenna ports, such SRS resource configuration and TPMI/co-phase/SRI indication techniques may result in undesirable signaling overhead and/or memory storage requirements. For example, extension of codebooks designed for smaller antenna port configurations may not be suitable for some wireless communications system as antenna port configurations increase or become more complex (e.g., such multi-panel configurations). For example, some codebooks may support 2/4-port with up to 2/4 layer transmission. Extending such codebooks (e.g., without sacrificing the inter-port precoding information granularity) to, for example, 8-port with up to 8-layer transmission may result in the size of the codebook growing significantly (e.g., exponentially). Additionally, extension in the size of such codebooks or explicit TPMI and co-phase indications through downlink control information (DCI) may result in increased DCI overhead.

Further, extending non-codebook based schemes for larger numbers of possible antenna port configurations (e.g., such as multi-panel configurations) may result in a significant increase in the number of SRS resources (e.g., as in non-codebook-based schemes, a base station may design a precoder and co-phase adjustment based on estimated downlink CSI corresponding to an SRS for each antenna port configuration).

The described SRS resource configuration schemes, in addition to described techniques for indicating co-phase information and uplink precoding information, may support multi-panel uplink transmission with a general number of ports and layers. A UE may transmit an indication of the UE capability (e.g., a number of SRS resources that may be configured by the network, a number of antenna ports supported for each SRS resource, a coherency capability between different antenna ports, etc.) to a base station. In some examples, the base station may configure multiple SRS resources (e.g., based on the UE capability), which may reduce DCI overhead that may otherwise accompany larger codebooks supporting multi-panel antenna ports. The UE may adjust inter-panel co-phase or precoders when transmitting different SRS over the different configured SRS resources. The base station may identify a preferred SRS, and may use DCI to indicate the best adjustment (e.g., the best inter-panel co-phase or precoder adjustment carried out by the UE over the different SRS resources) through an SRI. In cases where the UE adjusts co-phase between different antenna ports across the multiple SRS transmissions, the base station may additionally indicate precoding information (e.g., via TPMI or some other explicit indication). In cases where the UE adjusts the precoder between different antenna ports across the multiple SRS transmissions, the base station may additionally indicate co-phase information (e.g., an explicit co-phase indication) based on, for example, coherency information that may be indicated by the UE in the UE capability report. In some examples, the base station may configure a single SRS resource (e.g., based on the UE capability), and the base station may indicate separate explicit indications of co-phase information and uplink precoding information.

The described techniques may further provide for implementation of port selection patterns to account for the multiple panels or expanded antenna arrays that wireless communications systems may employ. For example, port selection patterns may indicate antenna port indices (e.g., such that certain panels or subsets of the panels may be selected). As such, explicit indications of uplink precoding information and/or co-phase information may include port selection patterns, such that uplink precoding information and/or co-phase information may be sent for different panels or subsets of the panels. Accordingly, reduced codebooks may be used, as smaller codebooks may be applied to each panels or each panel subset (e.g., 2-port and 4-port codebooks or precoders may be used for 8-port configurations).

Aspects of the disclosure are initially described in the context of wireless communications systems. An exemplary process flow implementing the described techniques is then discussed. Aspects of the disclosure are further illustrated by and described with reference to apparatus diagrams, system diagrams, and flowcharts that relate to configuration of SRS resource(s) for multi-panel uplink transmission.

FIG. 1 illustrates an example of a wireless communications system 100 that supports configuration of SRS resource(s) for multi-panel uplink transmission in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, MIMO communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

According to the described techniques, UEs 115 may transmit UE capability reports, to a base station 105, and the base station 105 may configure one or more SRS resources based at least in part on the capabilities of the UEs. For example, a UE 115 may then transmit SRSs according to an SRS configuration received from the base station 105.

The base station 105 may determine co-phase information and uplink precoding information (e.g., UE precoder information) based on the one or more received SRSs from the UE 115. The UE 115 may adjust precoders or co-phase between different SRS transmissions over the one or more configured SRS resources. As such, the base station 105 may indicate co-phase information or uplink precoding information via an SRI that indicates an SRS resource corresponding to one of the received SRS transmissions (e.g., as the SRI may implicitly indicate a co-phase adjustment or precoder adjustment used by the UE 115 for the SRS transmission on the indicated SRS resource). In such cases, the base station may transmit an explicit indication of the remaining co-phase information or uplink precoding information in addition to the SRI (e.g., in cases where the SRI indicates co-phase information, the base station 105 may transmit an explicit indication of uplink precoding information, and vice versa). In other examples (e.g., when only a single SRS resource is configured), the base station 105 may transmit explicit indications of uplink precoding information and co-phase information (e.g., the base station 105 may transmit TPMI to convey uplink precoding information, and may transmit a separate indication of co-phase information). The UE 115 may receive the uplink precoding indication and the co-phase information indication (e.g., via SRI and explicit indications), and may adjust SRS transmission parameters accordingly.

Figure 2:
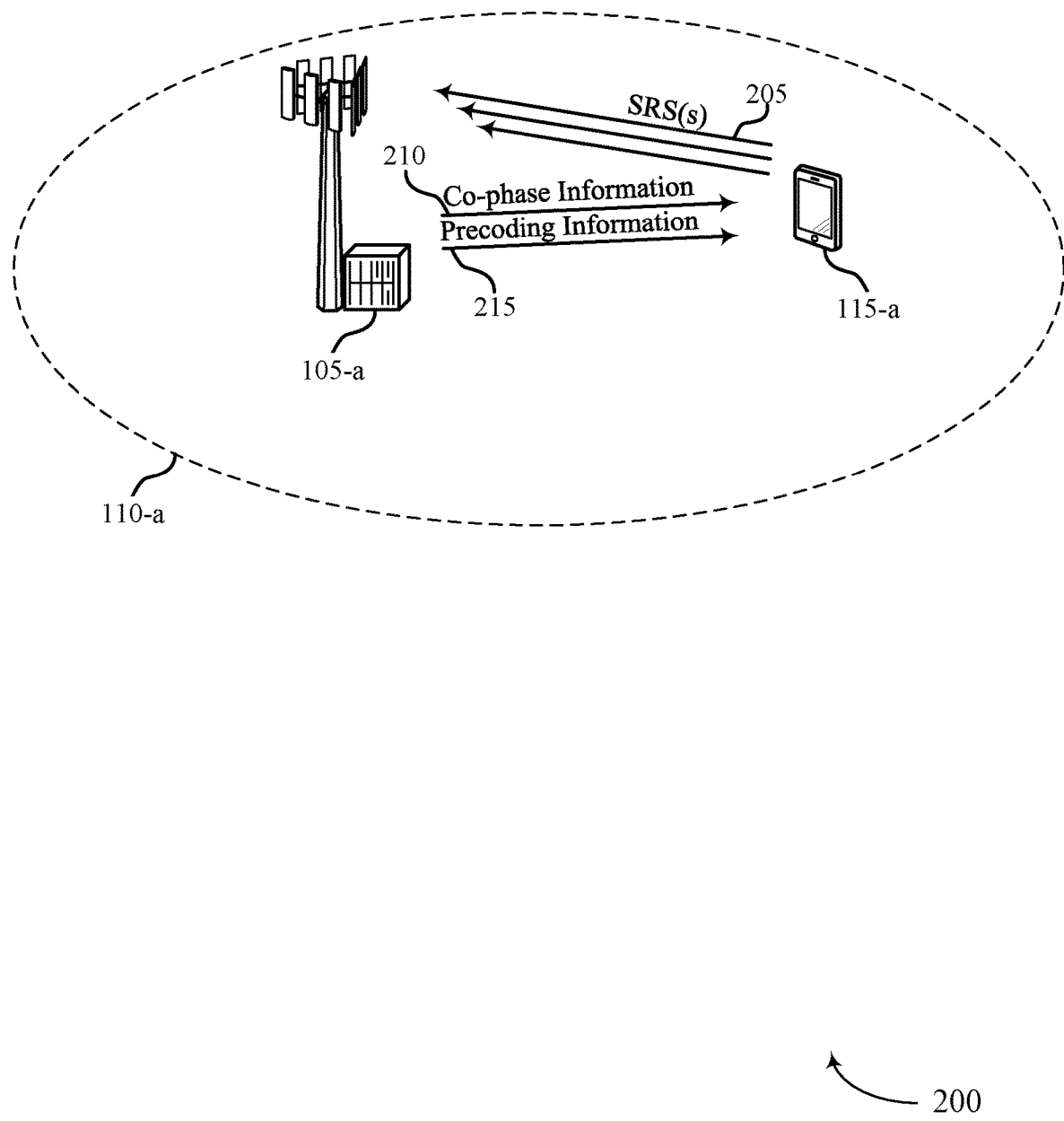
FIG. 2 illustrates an example of a wireless communications system that supports configuration of SRS resource(s) for multi-panel uplink transmission in accordance with aspects of the present disclosure.

FIG. 2 illustrates an example of a wireless communications system 200 that supports configuration of SRS resource(s) for multi-panel uplink transmission in accordance with aspects of the present disclosure. In some examples, wireless communications system 200 may implement aspects of wireless communications system 100. Wireless communications system 200 includes base station 105-*a* and UE 115-*a*, which may be examples of base stations 105 and UEs 115 as described with reference to FIG. 1. UE 115-*a* and base station 105-*a* may each be equipped with multiple antenna elements (e.g., antenna ports), which may be used to employ techniques such as transmit diversity, receive diversity, MIMO communications, or beamforming.

According to the described techniques, wireless communications system 200 may employ SRS resource configurations that may include configuration of SRSs 205 over multiple SRS resources such that SRIs may be used to indicate co-phase information 210 or uplink precoding information 215. Additionally or alternatively, wireless communications system 200 may employ explicit index indications (e.g., into a codebook or other predefined table) such that co-phase information 210 (e.g., phase difference between panels) and/or uplink precoding information 215 (e.g., UE precoder and number of transmission layers) corresponding to the index may be applied to different port selection patterns. To reduce DCI overhead, more SRS resources may be used for a certain level of non-codebook based adjustments (e.g., use of SRIs to convey co-phase information 210 or uplink precoding information 215). The network (e.g., base station 105-*a*) may use DCI to indicate the best adjustment through SRI, and may feedback the rest of the precoding information through TPMI or other explicit indication. That is, SRS resource overhead and DCI overhead may be balanced or considered by the network when determining SRS configurations (e.g., which may also consider UE capabilities). An example of three schemes is illustrated below in Table 1.

TABLE 1

| Number of SRS Resources | SRS Resource Usage by UE | Per Panel Number of SRS Ports | UE Capability Report | DCI Overhead |
| --- | --- | --- | --- | --- |
| Single | Uncoded Sounding | Multiple | # SRS ports & Inter-port Coherency | TPMI + Co-phase |
| Multiple | Co-Phase Adjustments | Multiple | # SRS Resources & # SRS ports per resource & Inter-port Coherency | SRI (Co-phase) + TPMI |
| Multiple | Precoder Adjustments | Single | # SRS Resources & # SRS ports per resource & Inter-port Coherency | SRI (Precoder) + Co-phase |

SRS configuration may depend on capabilities of UE 115-*a*. For example, base station 105-*a* may determine an SRS configuration (e.g., configure SRS resource(s) for SRS(s) 205) based on a number of SRS resources, ports, and layers for which the UE 115-*b* supports uplink transmission. The UE capability may include a number of supported SRS resources capability, a number of SRS ports (e.g., antenna ports for SRS) that may be supported by each SRS resource, a coherency capability between different SRS ports (e.g., whether an SRS port may be coherently combined together with another SRS port), etc. In some examples, the coherency capability may be either an explicit indication or compressed indication based on several candidate patterns. For example, for an 8-port configuration, an indication of 1*8 may indicate no coherency, 4+4 may indicate two 4-port coherency, 2+2+2+2 may indicate four 2-port coherency, 8 may indicate 8-port coherency, etc. In some examples, UE 115-*a* may indicate its UE capability to base station 105-*a* and the base station 105-*a* may then use the UE capability to configure one or more SRS resources for SRS 205 transmission by UE 115-*a*. In some cases, the same number of ports may be configured for each SRS resource.

In some examples, UE 115-*a* may be capable of transmitting SRS 205 to base station 105-*a* using a single SRS resource (e.g., or the base station 105-*a* may otherwise determine to only configure a single SRS resource). The base station 105-*a* may configure the single SRS resource with a number of ports based on the number of SRS ports supported per SRS resource and the coherency capability indicated by the UE 115-*a* (e.g., in the UE capability report). UE 115-*a* may transmit the SRS 205 (e.g., the single SRS 205 transmission) to base station 105-*a* on the single SRS resource with a number of SRS ports configured by base station 105-*a* (e.g., the number of SRS ports may be configured by the network via the SRS configuration). Base station 105-*a* may then transmit uplink precoding information 215 and co-phase information 210. For example, base station 105-*a* may transmit a single TPMI that indicates the uplink precoding information 215 (e.g., the precoder and number of layers) to be used for a transmission by the UE 115-*a* (e.g., by taking into account the coherency capability reported by the UE 115-*a*). The co-phase information 210 may, in some cases, be included in the TPMI indication. In other cases, the co-phase information 210 may be separately indicated for the ports being capable of coherent transmission.

In other examples, UE 115-*a* may be capable of transmitting SRS 205 to base station 105-*a* using multiple SRS resources. In such cases where multiple SRS resources may be configured, UE 115-*a* may transmit an SRS 205 on each of the configured SRS resources. For example, the base station 105-*a* may configure a number of SRS resources based on the number of SRS resources capability of the UE 115-*a*. Further, in some cases, base station 105-*a* may configure each of the one or more SRS resources with one or more antenna ports (e.g., SRS ports) based on the number of SRS ports supported per SRS resource capability of the UE 115-*a*. For example, the base station 105-*a* may configure up to some number of ports the UE 115-*a* is capable of using per SRS resource (e.g., a maximum number of ports), as indicated by the UE capability report, for each SRS resource that is ultimately configured by the base station 105-*a*. In some cases, the antenna ports (e.g., or SRS ports) configured for the SRS resources may be based on the coherency capability of the UE 115-*a* (e.g., base station 105-*a* may configure antenna ports the UE 115-*a* has indicated as being able to be coherently combined). In some cases, the same number of ports are configured for each SRS resource.

In some cases, the UE 115-*a* may transmit one or more SRSs 205 and adjust the co-phase between different SRS ports for each SRS transmission. The UE 115-*a* may transmit SRSs 205 on each SRS resource configured by the base station 105-*a* with the number of ports configured by the base station 105-*a*. Based on the UE-decided co-phases, a base station 105-*a* may transmit an SRI indicating the best co-phase adjustment to the UE 115-*a*. That is, the indication of co-phase information 210 may be conducted through SRI, such that more SRS resources may be used instead of DCI overhead. For example, the base station 105-*a* may identify or select a preferred SRS 205 (e.g., an SRS associated with the best channel quality) and may indicate the preferred SRS via an SRI (e.g., where the SRI indicates the configured SRS resource corresponding to the preferred SRS). The UE 115-*a* may then identify the best co-phase adjustment, as the UE 115-*a* may recall what co-phase adjustment corresponds to the preferred SRS (e.g., the preferred SRS indicated by the base station 105-*a* via the SRI). In such cases, base station 105-*a* may indicate uplink precoding information 215 in the form of an explicit indication (e.g., TPMI or some other index into a codebook). For example, base station 105-*a* may indicate a TPMI to UE 115-*a* to indicate the uplink precoding information 215 (e.g., a UE precoder) on top of the co-phase adjustment (e.g., indicated via SRI). The number of layers to be transmitted by UE 115-*a* in PUSCH may be explicitly indicated or implicitly indicated based on the selected TPMI. In some cases, the TPMI indication may take the coherency capability of the UE 115-a into consideration (e.g., as only a subset of the overall TPMI set may be considered for indication, corresponding to a particular coherency capability).

In some examples, a precoder port selection pattern may be used where uplink precoding information 215 is explicitly indicated (e.g., in the first two examples of Table 1). That is, a precoder port selection pattern may be included with uplink precoding information 215 indications (e.g., in the form of additional bits) to indicate antenna port indices (e.g., certain panels or subsets of panels) associated with the uplink precoding information 215 (e.g., the port selection pattern may indicate indices of antenna ports the TPMI corresponds to). As such, codebooks of reduced size may be used for larger antenna port configurations, and different precoders may be selected for different panels. In some cases, the actual patterns supported may be a subset of the allowed patterns (e.g., such that the additional number of bits used to indicate the precoder port selection pattern may depend on the supported patterns). In cases where multiple groups of ports (e.g., multiple panels) are selected, different panels may have different TPMI corresponding to the number of ports. An example of precoder port selection patterns is shown below in Table 2 (e.g., where four additional bits, values 0-15, may be used to indicate patterns 1-16).

TABLE 2

| #Pattern | Ports | Precoders |
| --- | --- | --- |
| 1 | 1 + 2 | 2-port-TPMI |
| 2 | 3 + 4 | 2-port-TPMI |
| 3 | 5 + 6 | 2-port-TPMI |
| 4 | 7 + 8 | 2-port-TPMI |
| 5-8 | 2-port & 2-port | 2-port-TPMI x2 |
| 9-12 | 2-port x3 | 2-port-TPMI x3 |
| 13 | 1 + 2 + 3 + 4 | 4-port-TPMI |
| 14 | 5 + 6 + 7 + 8 | 4-port-TPMI |
| 15 | 1 + 2 + 3 + 4, & 5 + 6 + 7 + 8 | 4-port-TPMI x2 |
| 16 | 1 + 2, & 3 + 4, & 5 + 6, & 7 + 8 | 2-port-TPMI x4 |

In some examples, identical precoders may be used for different panels. Additional bits may be used for port (e.g., panel) selection. The actual patterns supported may be a subset of the allowed patterns. In cases where multiple groups of ports (e.g., multiple panels) are selected, different panels may have identical TPMI corresponding to the number of ports. For example, if only patterns #13-15 above in Table 2 are supported (e.g., either single panel with 4-ports, or two panels each with 4-ports), only 2 additional bits may be used for port-group (e.g., panel) selection.

In other examples, the UE 115-a may transmit one or more SRSs 205 and adjust the precoder between different SRS ports for each SRS transmission. The UE 115-a may transmit SRSs 205 on each SRS resource configured by the base station 105-a with the number of ports configured by the base station 105-a. Based on the UE precoder adjustments between different SRS 205 transmissions, base station 105-a may transmit an SRI indicating the best precoder adjustment to the UE 115-a. That is, the indication of uplink precoding information 215 may be conducted through SRI, such that more SRS resources may be used instead of DCI overhead. For example, the base station 105-a may identify or select a preferred SRS 205 (e.g., an SRS associated with the best channel quality) and may indicate the preferred SRS via an SRI (e.g., where the SRI indicates the configured SRS resource corresponding to the preferred SRS). The UE 115-a may then identify the best precoder, as the UE may recall what precoder adjustment corresponds to the preferred SRS (e.g., the preferred SRS indicated by the base station 105-a via the SRI). In such cases, base station 105-a may indicate co-phase information 210 in the form of an explicit indication (e.g., possibly with the same amount of bitwidth for TPMI). For example, base station 105-a may indicate a TPMI to UE 115-a to indicate the co-phase information 210 on top of the precoder (e.g., indicated via SRI).

For example, the SRI indication may be used to decide precoders. The network (e.g., base station 105-a) may indicate an SRI to UE 115-a to decide the best precoders associated with the corresponding SRS resources calculated by the UE 115-a. In some cases, the number of SRS resources used by the UE 115-a may be the maximum number of layers to be transmitted in PUSCH. In some cases, the number of SRS resources indicated in the SRI may equal the number of layers to be transmitted in PUSCH. The network may also indicate the co-phase adjustments between different SRS ports. The network may configure co-phase between SRS ports capable of coherent combining, which may be based on the UE coherency capability indicated in the UE capability report.

Figure 3:
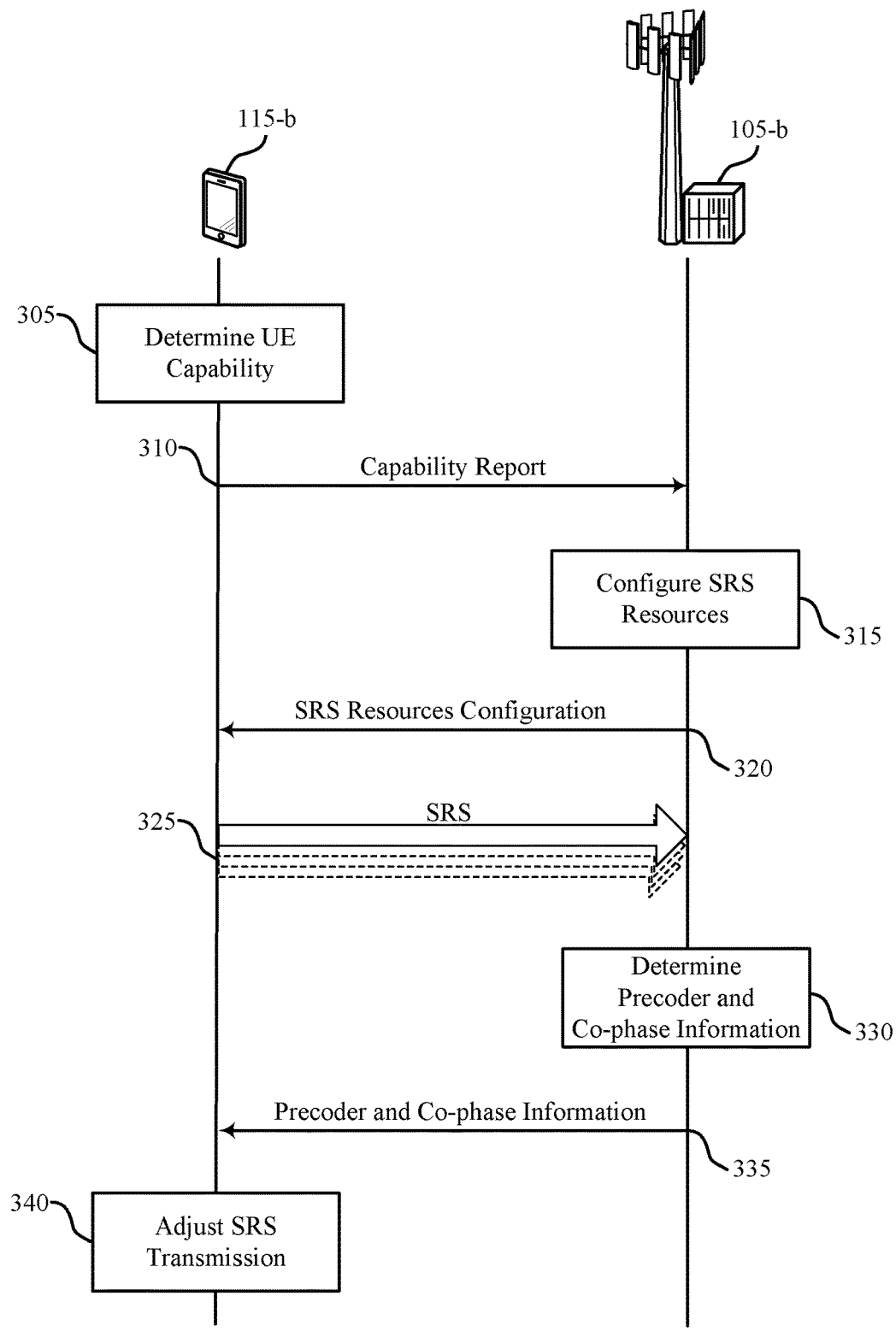
FIG. 3 illustrates an example of a process flow that supports configuration of SRS resource(s) for multi-panel uplink transmission in accordance with aspects of the present disclosure.

FIG. 3 illustrates an example of a process flow 300 that supports configuration of SRS resource(s) for multi-panel uplink transmission in accordance with aspects of the present disclosure. In some examples, process flow 300 may implement aspects of wireless communications system 100 and wireless communications system 200. Process flow 300 includes base station 105-b and UE 115-b, which may be examples of base stations 105 and UEs 115 as described with reference to FIGS. 1 and 2. Process flow 300 may illustrate base station 105-b configuring UE-115 b with one or more SRS resources for support of multi-panel uplink transmission. In the following description of the process flow 300, the operations between the UE 115-b and the base station 105-b may be transmitted in a different order than the exemplary order shown, or the operations performed by UE 115-b and base station 105-b may be performed in different orders or at different times. In some cases, certain operations may also be left out of the process flow 300, or other operations may be added to the process flow 300.

At 305, UE 115-b may determine or identify a UE capability. For example, UE 115-b may generate a UE capability report indicating a number of SRS resources capability (e.g., a number of SRS resources a UE is capable of transmitting SRS over), a number of SRS ports supported per SRS resource capability (e.g., a number of antenna ports the UE is capable of using for each SRS transmission over the one or more supported SRS resources), an antenna port coherency capability (e.g., groups or sets of antenna ports that may be coherently combined), etc. At 310, UE 115-b may transmit the UE capability report to base station 105-b.

At 315, base station 105-b may configure one or more SRS resources (e.g., based on the UE capability report received at 310). For example, the base station 105-b may configure a number of SRS resources based on the number of SRS resources capability of the UE 115-b. Further, in some cases, base station 105-b may configure each of the one or more SRS resources with one or more antenna ports (e.g., SRS ports) based on the number of SRS ports supported per SRS resource capability of the UE 115-b. For example, the base station 105-b may configure up to some maximum number of ports the UE 115-b is capable of using per SRS resource, as indicated by the UE capability report, for each SRS resource that is ultimately configured by the base station 105-*b*. In some cases, the antenna ports (e.g., or SRS ports) configured for the SRS resources may be based on the coherency capability of the UE 115-*b* (e.g., base station 105-*b* may configure antenna ports the UE 115-*b* has indicated as being able to be coherently combined). In some cases, the same number of ports are configured for each SRS resource.

At 320, base station 105-*b* may transmit the SRS resource configuration to UE 115-*b*. The SRS resource configuration transmission may indicate the SRS resource configuration determined at 315.

At 325, UE 115-*b* may transmit one or more SRSs based at least in part on the SRS resource configuration received at 320. For example, the UE 115-*b* may transmit an SRS on each SRS resource indicated by the SRS resource configuration, and each SRS may be transmitted with one or more SRS ports that may also be indicated by the SRS resource configuration.

In some cases, the UE 115-*b* may identify a co-phase adjustment for each of the one or more SRS resources, and may transmit the one or more SRSs (e.g., SRS over each configured SRS resource) based at least in part on the identified co-phase adjustments. For example, the UE 115-*b* may adjust the co-phase from one SRS transmission to the next, such that each SRS transmission, and thus each SRS resource, may be associated with a different co-phase adjustment.

In some cases, the UE 115-*b* may identify a precoder adjustment for each of the one or more SRS resources, and may transmit the one or more SRSs (e.g., SRS over each configured SRS resource) based at least in part on the identified precoder adjustments. For example, the UE 115-*b* may adjust the precoder from one SRS transmission to the next, such that each SRS transmission, and thus each SRS resource, may be associated with a different precoder adjustment.

At 330, base station 105-*b* may determine co-phase information (e.g., a co-phase adjustment) and uplink precoding information (e.g., a precoder adjustment) based on the one or more SRSs received at 325. In some cases (e.g., when UE 115-*b* adjusts the co-phase for each SRS transmission), base station 105-*b* may determine the co-phase for each of the SRS resources based on the one or more received SRSs (e.g., the SRS received on each SRS resource). Further, base station 105-*b* may select an SRS resource based on the co-phase associated with the selected SRS resource (e.g., based on the preferred co-phase adjustment, selected based on the preferred or selected SRS transmission). The base station 105-*b* may generate or determine an SRI corresponding to the selected SRS resource (e.g., and thus the selected co-phase adjustment), such that the SRI may indicate co-phase information.

In some cases (e.g., when UE 115-*b* adjusts the precoder for each SRS transmission), base station 105-*b* may select an SRS resource (e.g., based on the precoder associated with the selected SRS resource, based on the best or preferred SRS received, etc.). In such cases, the base station 105-*b* may generate or determine an SRI corresponding to the selected SRS resource (e.g., and thus the selected precoder adjustment), such that the SRI may indicate precoder information).

In some cases, co-phase information and/or precoder information may be explicitly indicated by base station 105-*b*. For example, in cases where SRI is used to indicate co-phase information, base station 105-*b* may identify or generate an explicit indication of precoding information. In other examples, where SRI is used to indicate precoder information, base station may identify or generate an explicit indication of co-phase information. In yet other examples (e.g., when only a single SRS resource is configured), base station 105-*b* may use explicit indications (e.g., instead of SRI) for conveying both co-phase information and precoder information.

In some examples, base station 105-*b* may select a group of UE 115-*b* antenna ports based at least in part on the one or more received SRSs (e.g., and in some cases further based on the coherency capability indicated by UE 115-*b*) and may identify a precoder port selection pattern based in part on the selected group of UE antenna ports. In some cases, the base station 105-*b* may include the precoder port selection pattern in an uplink precoding information indication (e.g., in an explicit uplink precoding information indication). In some examples, base station 105-*b* may further determine a number of PUSCH transmission layers. In some examples, the uplink precoding information may include the precoder port selection pattern, the number of PUSCH transmission layers, the selected group of UE antenna ports (e.g., selection of a subset of antenna ports) for PUSCH transmission, or some combination thereof.

At 335, base station 105-*b* may transmit a co-phase information indication and an uplink precoding information indication to UE 115-*b*. As discussed herein, in some cases base station 105-*b* may transmit an SRI that includes or refers to the co-phase information indication, and the uplink precoding information may be transmitted in the form of some explicit indication, such as an index (e.g., a TPMI) indicating the precoding information (e.g., precoder adjustment) and the number of layers (e.g., number of PUSCH transmission layers) from predefined options (e.g., in a codebook). In other examples, the SRI may include or refer to the uplink precoding information indication, and the co-phase information indication may be transmitted in the form of some explicit indication, such as an index indicating a co-phase adjustment from predefined options (e.g., in a codebook).

At 340, UE 115-*b* may adjust transmission parameters (e.g., for SRS transmission, data transmission, etc.) based in part on the co-phase information indication and the uplink precoding information indication received 335. For example, in some cases, UE 115-*b* may determine (e.g., based on the uplink precoding information indication) a precoding matrix, a number of PUSCH transmission layers, a selection of a subset of antenna ports for PUSCH transmission, etc. Additionally or alternatively, UE 115-*b* may adjust parameters for channel orthogonalization between different layers based on the received co-phase information. The UE 115-*b* may accordingly adjust SRS transmission parameters. In some cases, transmission parameters may be adjusted for other uplink transmissions (e.g., data transmissions) based on the received co-phase information and precoder information.

Figure 4:
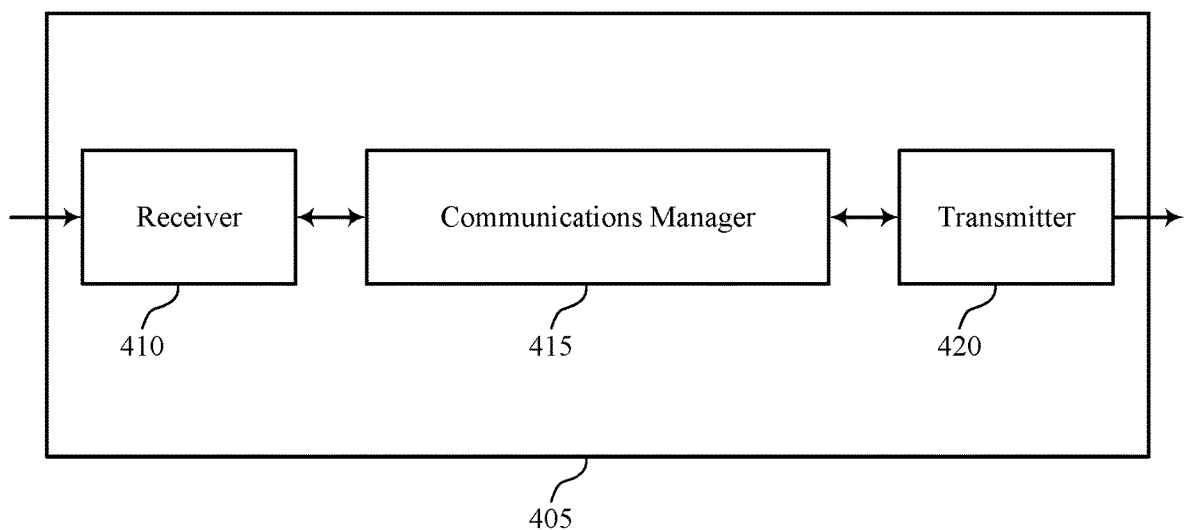
FIGS. 4 and 5 show block diagrams of devices that support configuration of SRS resource(s) for multi-panel uplink transmission in accordance with aspects of the present disclosure.

FIG. 4 shows a block diagram 400 of a device 405 that supports configuration of SRS resource(s) for multi-panel uplink transmission in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to configuration of SRS resource(s) for multi-panel uplink transmission, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive, from a base station, an SRS resource configuration for one or more SRS resources and transmit, to the base station, one or more SRSs based on the SRS resource configuration. The communications manager 415 may receive, from the base station, at least one of an uplink precoding information indication and a co-phase information indication, the uplink precoding information indication and the co-phase information indication being based on the one or more transmitted SRSs, and adjust SRS transmission parameters based at least on the uplink precoding information indication and the co-phase information indication. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, communications manager 415 may be implemented as an integrated circuit or chipset for a mobile device modem, and the receiver 410 and transmitter 420 may be implemented as analog components (e.g., amplifiers, filters, antennas, etc.) coupled with the mobile device modem to enable wireless transmission and reception.

The communications manager 415 as described herein may be implemented to realize one or more potential advantages. Various implementations may reduce the amount of time a device uses to lookup information (e.g., using a codebook or lookup table) such as various transmission parameters or precoding information. In at least one implementation, port selection patterns and explicit indication of uplink precoding information and/or co-phase information may improve communications within the wireless network.

Based on implementing the interference mitigation techniques as described herein, one or more processors of the device 405 (e.g., processor(s) controlling or incorporated with one or more of receiver 410, communications manager 415, and transmitter 420) may reduce latency arising from lookup procedures, and may similarly reduce memory storage burdens and overhead associated with codebook related signaling. This may enhance device and processor efficiency and may further enhance user experience.

Figure 5:
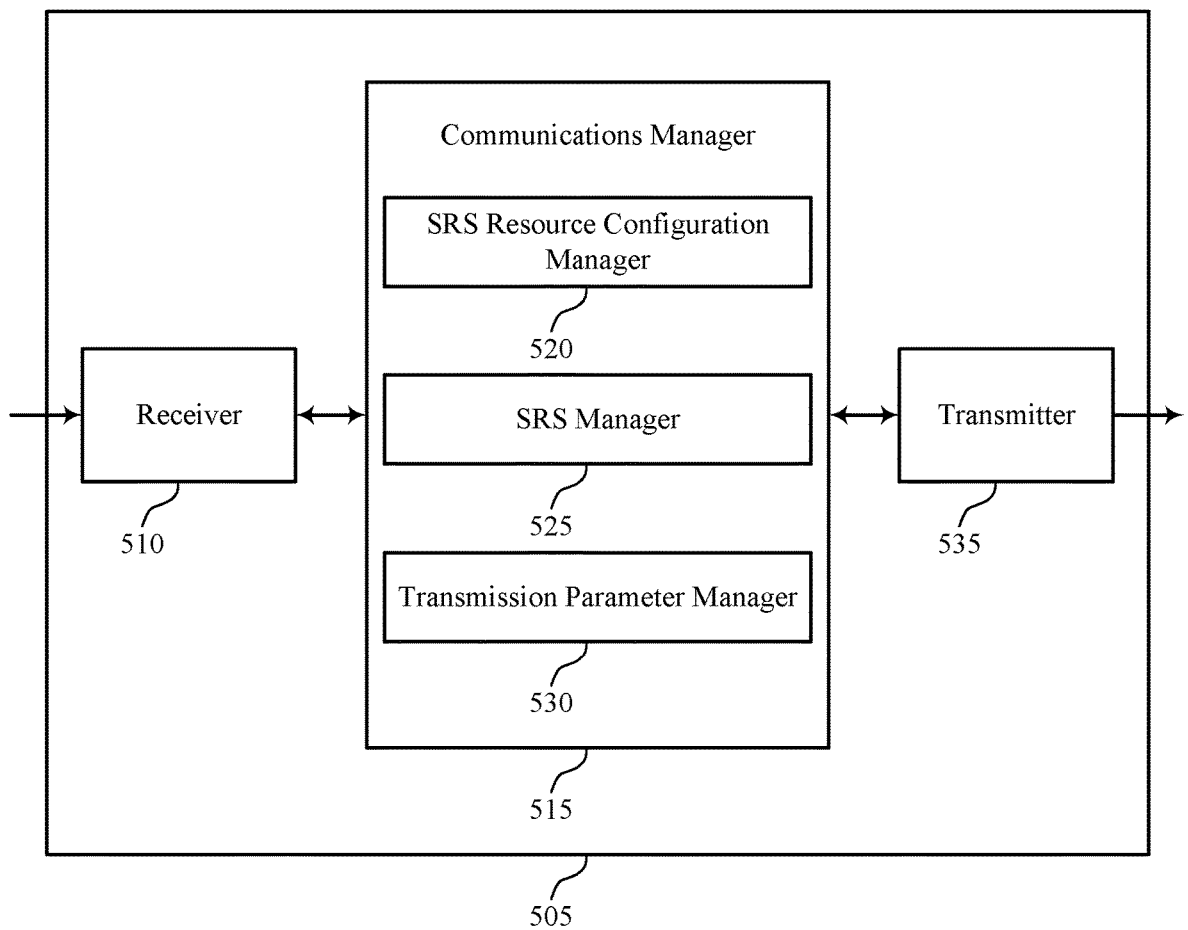

FIG. 5 shows a block diagram 500 of a device 505 that supports configuration of SRS resource(s) for multi-panel uplink transmission in accordance with aspects of the present disclosure. The device 505 may be an example of aspects of a device 405 or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to configuration of SRS resource(s) for multi-panel uplink transmission, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include an SRS resource configuration manager 520, an SRS manager 525, and a transmission parameter manager 530. The communications manager 515 may be an example of aspects of the communications manager 710 described herein.

The SRS resource configuration manager 520 may receive, from a base station, an SRS resource configuration for one or more SRS resources. The SRS manager 525 may transmit, to the base station, one or more SRSs based on the SRS resource configuration. The transmission parameter manager 530 may receive, from the base station, at least one of an uplink precoding information indication and a co-phase information indication, the uplink precoding information indication and the co-phase information indication being based on the one or more transmitted SRSs and adjust SRS transmission parameters based at least on the uplink precoding information indication and the co-phase information indication.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
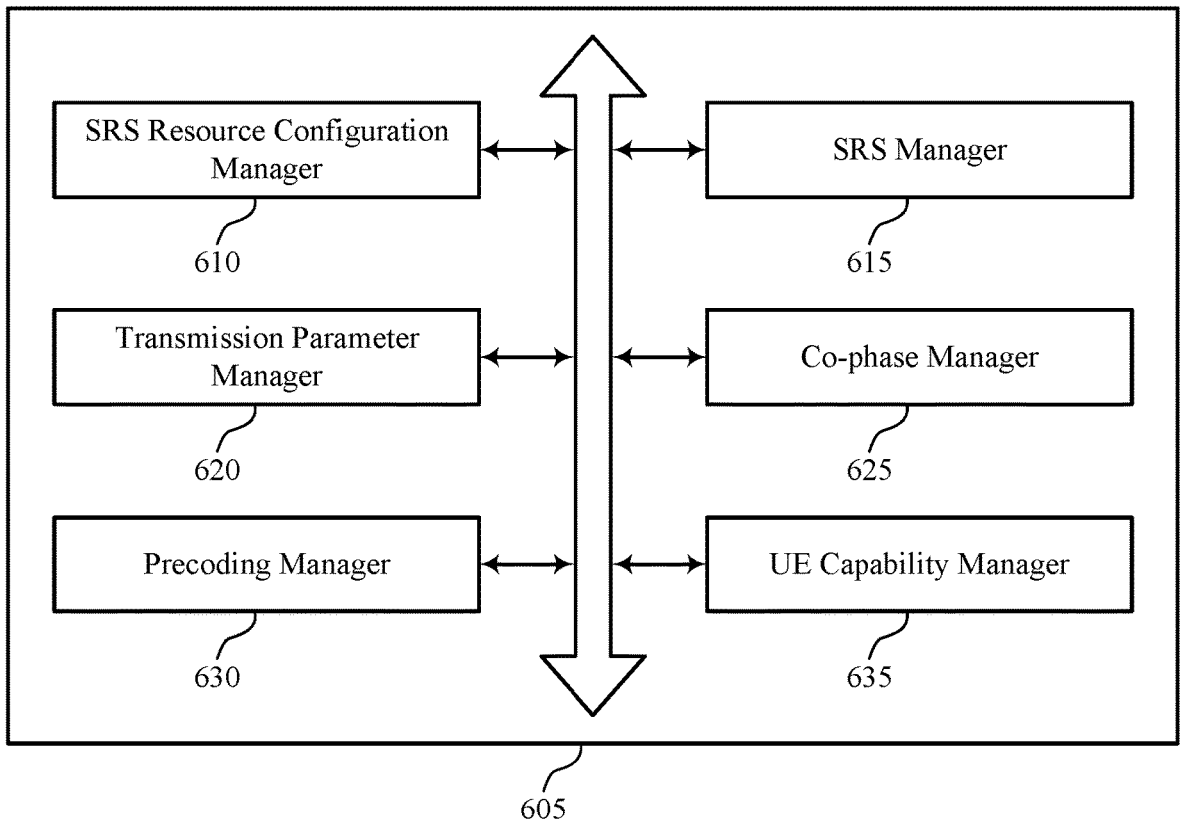
FIG. 6 shows a block diagram of a communications manager that supports configuration of SRS resource(s) for multi-panel uplink transmission in accordance with aspects of the present disclosure.

FIG. 6 shows a block diagram 600 of a communications manager 605 that supports configuration of SRS resource(s) for multi-panel uplink transmission in accordance with aspects of the present disclosure. The communications manager 605 may be an example of aspects of a communications manager 415, a communications manager 515, or a communications manager 710 described herein. The communications manager 605 may include an SRS resource configuration manager 610, an SRS manager 615, a transmission parameter manager 620, a co-phase manager 625, a precoding manager 630, and an UE capability manager 635. Each of these modules may communicate, directly or indirectly, with one another (e.g., via one or more buses).

The SRS resource configuration manager 610 may receive, from a base station, an SRS resource configuration for one or more SRS resources. The SRS manager 615 may transmit, to the base station, one or more SRSs based on the SRS resource configuration.

The transmission parameter manager 620 may receive, from the base station, at least one of an uplink precoding information indication and a co-phase information indication, the uplink precoding information indication and the co-phase information indication being based on the one or more transmitted SRSs. In some examples, the transmission parameter manager 620 may adjust SRS transmission parameters based at least on the uplink precoding information indication and the co-phase information indication. In some examples, the transmission parameter manager 620 may transmit the one or more SRSs based on the identified co-phase adjustments. In some examples, the transmission parameter manager 620 may transmit the one or more SRSs based on the identified precoder adjustments. In some examples, the transmission parameter manager 620 may determine, based on the SRI, a number of PUSCH transmission layers, where the number of PUSCH transmission layers is equal to the number of SRS resources indicated in the SRI. In some cases, the uplink precoding information indication includes a precoder port selection pattern indicating the selection of the subset of antenna ports for PUSCH transmission. In some cases, the uplink precoding information indication further indicates a number of layers.

The co-phase manager 625 may identify a co-phase adjustment for each of the one or more SRS resources. In some examples, receiving an SRI indicating a selected SRS resource of the one or more SRS resources based on the one or more transmitted SRSs, where the co-phase information indication includes the co-phase adjustment associated with the selected SRS resource indicated by the SRI.

The precoding manager 630 may determine, based on the uplink precoding information indication, a precoding matrix, a number of PUSCH transmission layers, a selection of a subset of antenna ports for PUSCH transmission, or some combination thereof. In some examples, the precoding manager 630 may identify a precoder adjustment for each of the one or more SRS resources.

In some examples, receiving an SRI indicating a selected SRS resource of the one or more SRS resources based on the one or more transmitted SRSs, where the uplink precoding information indication includes the precoder adjustment associated with the selected SRS resource indicated by the SRI.

The UE capability manager 635 may transmit a UE capability report indicating a number of SRS resources capability, a number of SRS ports supported per SRS resource capability, an antenna port coherency capability, or some combination thereof, where the SRS resource configuration is based on the transmitted UE capability report. In some cases, the uplink precoding information indication includes an index of uplink precoding information and number of layers. In some cases, each SRS resource of the one or more SRS resources includes a set of antenna ports.

Figure 7:
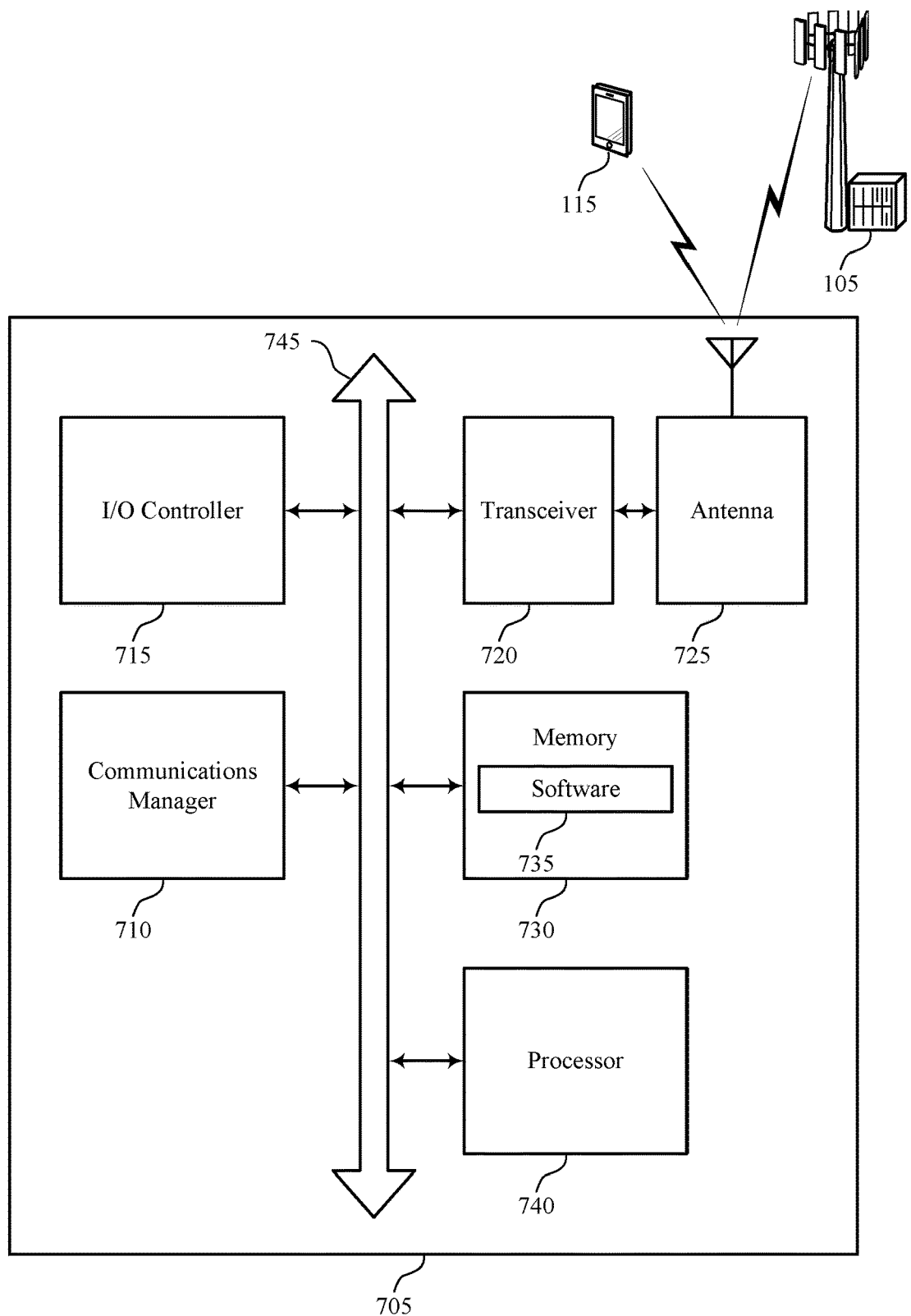
FIG. 7 shows a diagram of a system including a device that supports configuration of SRS resource(s) for multi-panel uplink transmission in accordance with aspects of the present disclosure.

FIG. 7 shows a diagram of a system 700 including a device 705 that supports configuration of SRS resource(s) for multi-panel uplink transmission in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive, from a base station, an SRS resource configuration for one or more SRS resources, transmit, to the base station, one or more SRSs based on the SRS resource configuration, receive, from the base station, at least one of an uplink precoding information indication and a co-phase information indication, the uplink precoding information indication and the co-phase information indication being based on the one or more transmitted SRSs, and adjust SRS transmission parameters based at least on the uplink precoding information indication and the co-phase information indication.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code or software 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting configuration of SRS resource(s) for multi-panel uplink transmission).

The software 735 may include instructions to implement aspects of the present disclosure, including instructions to support wireless communications. The software 735 may be stored in a non-transitory computer-readable medium such as system memory or other type of memory. In some cases, the software 735 may not be directly executable by the processor 740 but may cause a computer (e.g., when compiled and executed) to perform functions described herein.

Figure 8:
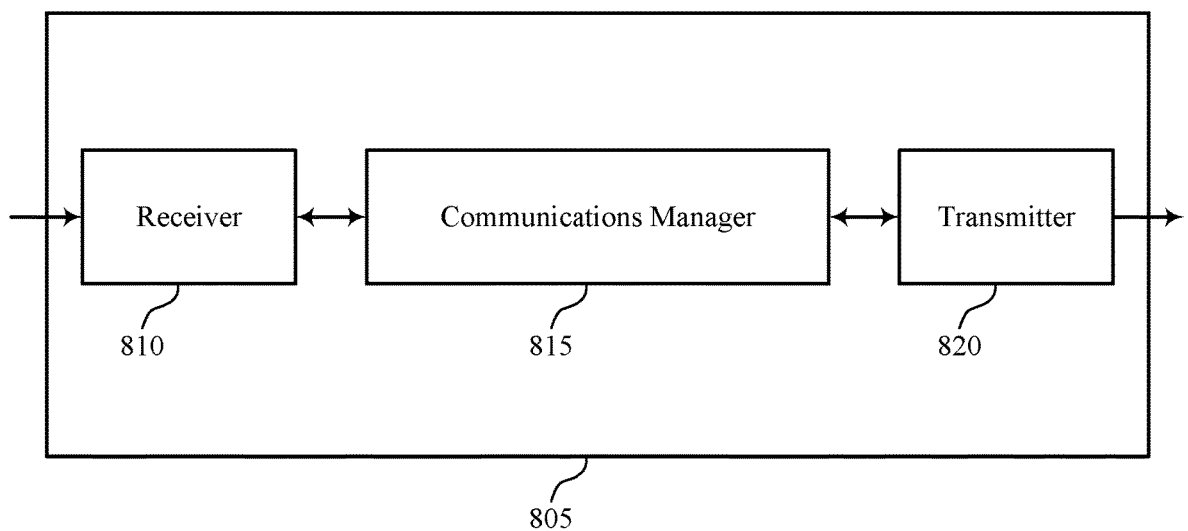
FIGS. 8 and 9 show block diagrams of devices that support configuration of SRS resource(s) for multi-panel uplink transmission in accordance with aspects of the present disclosure.

FIG. 8 shows a block diagram 800 of a device 805 that supports configuration of SRS resource(s) for multi-panel uplink transmission in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to configuration of SRS resource(s) for multi-panel uplink transmission, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit, to a UE, an SRS resource configuration for one or more SRS resources and receive, from the UE, one or more SRSs based on the SRS resource configuration. The communications manager 815 may transmit, to the UE, at least one of an uplink precoding information indication and a co-phase information indication, the uplink precoding information indication and the co-phase information indication being based on the one or more SRSs. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
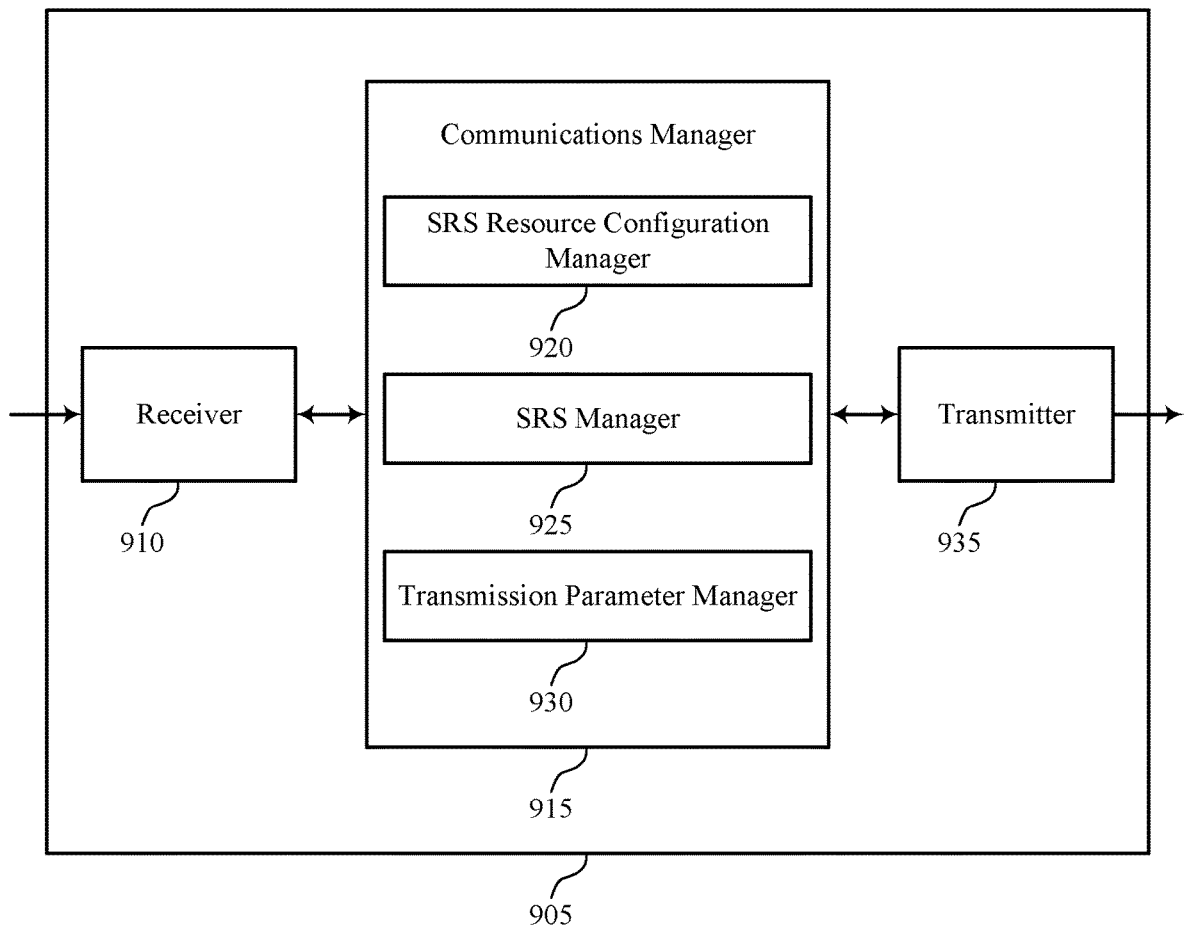

FIG. 9 shows a block diagram 900 of a device 905 that supports configuration of SRS resource(s) for multi-panel uplink transmission in accordance with aspects of the present disclosure. The device 905 may be an example of aspects of a device 805 or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to configuration of SRS resource(s) for multi-panel uplink transmission, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include an SRS resource configuration manager 920, an SRS manager 925, and a transmission parameter manager 930. The communications manager 915 may be an example of aspects of the communications manager 1110 described herein.

The SRS resource configuration manager 920 may transmit, to a UE, an SRS resource configuration for one or more SRS resources. The SRS manager 925 may receive, from the UE, one or more SRSs based on the SRS resource configuration. The transmission parameter manager 930 may transmit, to the UE, at least one of an uplink precoding information indication and a co-phase information indication, the uplink precoding information indication and the co-phase information indication being based on the one or more SRSs.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
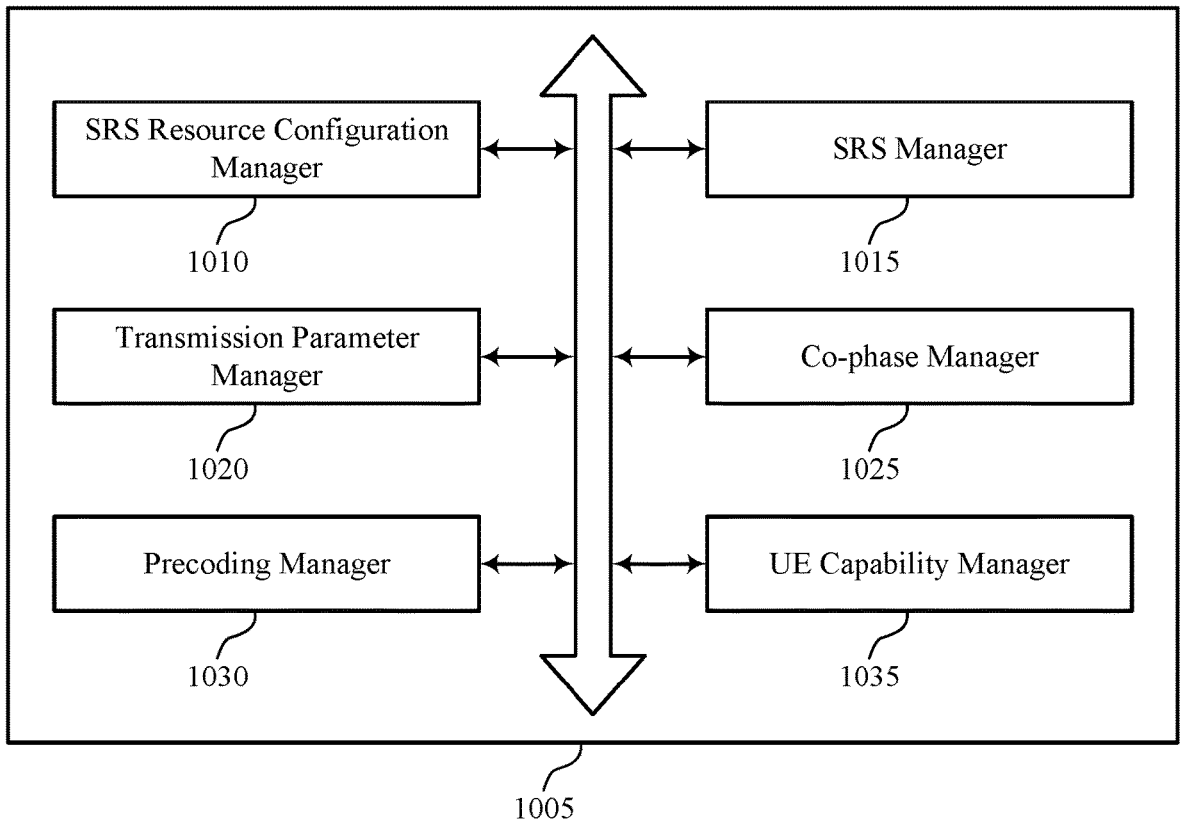
FIG. 10 shows a block diagram of a communications manager that supports configuration of SRS resource(s) for multi-panel uplink transmission in accordance with aspects of the present disclosure.

FIG. 10 shows a block diagram 1000 of a communications manager 1005 that supports configuration of SRS resource(s) for multi-panel uplink transmission in accordance with aspects of the present disclosure. The communications manager 1005 may be an example of aspects of a communications manager 815, a communications manager 915, or a communications manager 1110 described herein. The communications manager 1005 may include an SRS resource configuration manager 1010, an SRS manager 1015, a transmission parameter manager 1020, a co-phase manager 1025, a precoding manager 1030, and an UE capability manager 1035. Each of these modules may communicate, directly or indirectly, with one another (e.g., via one or more buses).

The SRS resource configuration manager 1010 may transmit, to a UE, an SRS resource configuration for one or more SRS resources. In some examples, the SRS resource configuration manager 1010 may identify the SRS resource configuration based on the received UE capability report. In some cases, each SRS resource of the one or more SRS resources includes a set of antenna ports.

The SRS manager 1015 may receive, from the UE, one or more SRSs based on the SRS resource configuration. In some examples, the SRS manager 1015 may select an SRS resource based on the co-phase associated with the selected SRS resource. In some examples, the SRS manager 1015 may select a group of UE antenna ports based on the one or more received SRSs. In some examples, the SRS manager 1015 may select an SRS resource based on the one or more received SRS.

The transmission parameter manager 1020 may transmit, to the UE, at least one of an uplink precoding information indication and a co-phase information indication, the uplink precoding information indication and the co-phase information indication being based on the one or more SRSs. In some examples, transmitting an SRI indicating the selected SRS resource, where the co-phase information indication includes the SRI. In some examples, transmitting the uplink precoding information indication, where the uplink precoding information indication includes the identified precoder port selection pattern. In some examples, transmitting an SRI indicating the selected SRS resource, where the uplink precoding information indication includes the SRI. In some cases, the uplink precoding information indication includes an index of uplink precoding information and number of layers. In some cases, the uplink precoding information indication further indicates a number of layers.

The co-phase manager 1025 may determine a co-phase for each of the SRS resources based on the one or more received SRSs. The precoding manager 1030 may identify a precoder port selection pattern based on the selecting. The UE capability manager 1035 may receive a UE capability report indicating a number of SRS resources capability, a number of SRS ports supported per SRS resource capability, an antenna port coherency capability, or some combination thereof.

Figure 11:
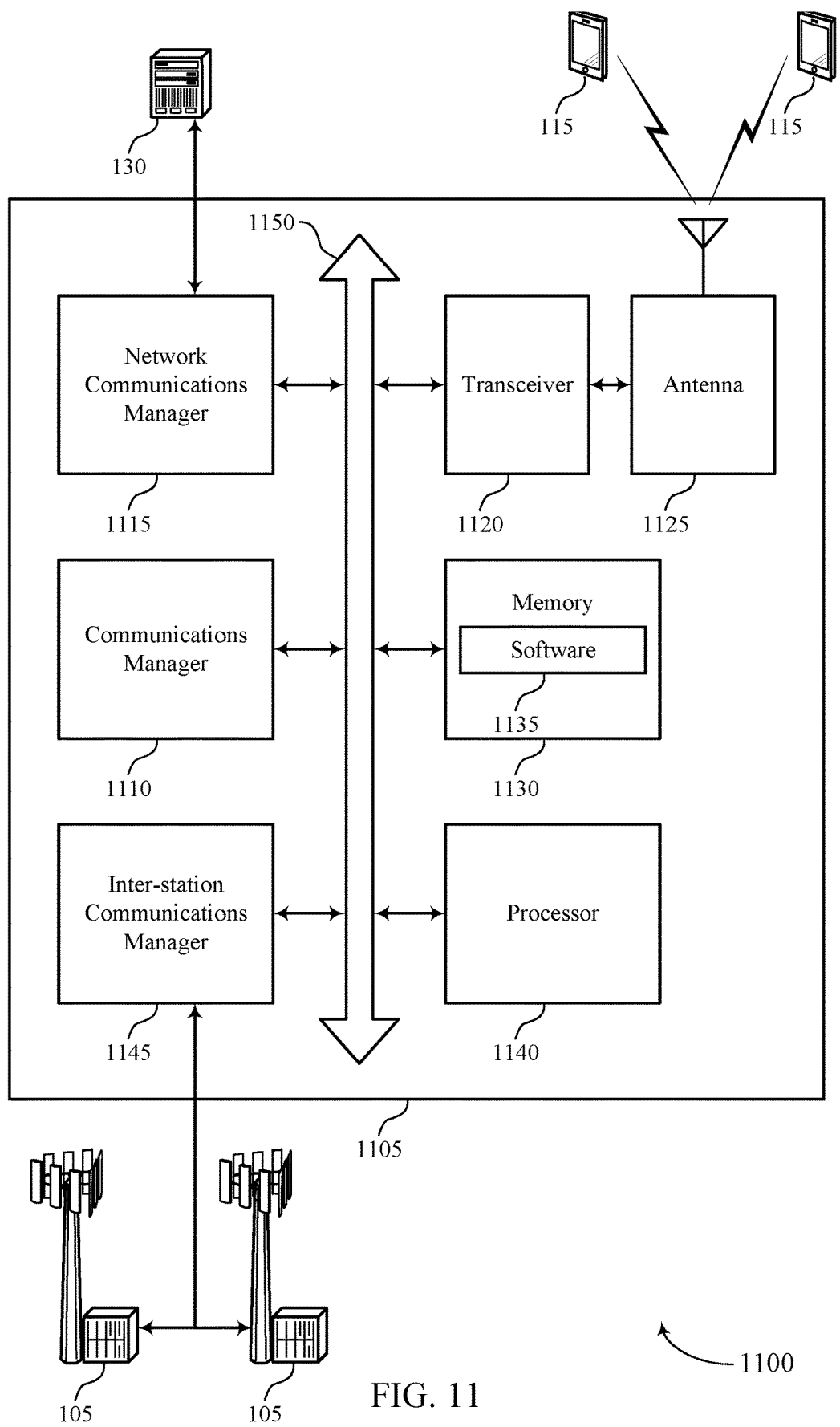
FIG. 11 shows a diagram of a system including a device that supports configuration of SRS resource(s) for multi-panel uplink transmission in accordance with aspects of the present disclosure.

FIG. 11 shows a diagram of a system 1100 including a device 1105 that supports configuration of SRS resource(s) for multi-panel uplink transmission in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit, to a UE, an SRS resource configuration for one or more SRS resources, receive, from the UE, one or more SRSs based on the SRS resource configuration, and transmit, to the UE, at least one of an uplink precoding information indication and a co-phase information indication, the uplink precoding information indication and the co-phase information indication being based on the one or more SRSs.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code or software 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting configuration of SRS resource(s) for multi-panel uplink transmission).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The software 1135 may include instructions to implement aspects of the present disclosure, including instructions to support wireless communications. The software 1135 may be stored in a non-transitory computer-readable medium such as system memory or other type of memory. In some cases, the software 1135 may not be directly executable by the processor 1140 but may cause a computer (e.g., when compiled and executed) to perform functions described herein.

Figure 12:
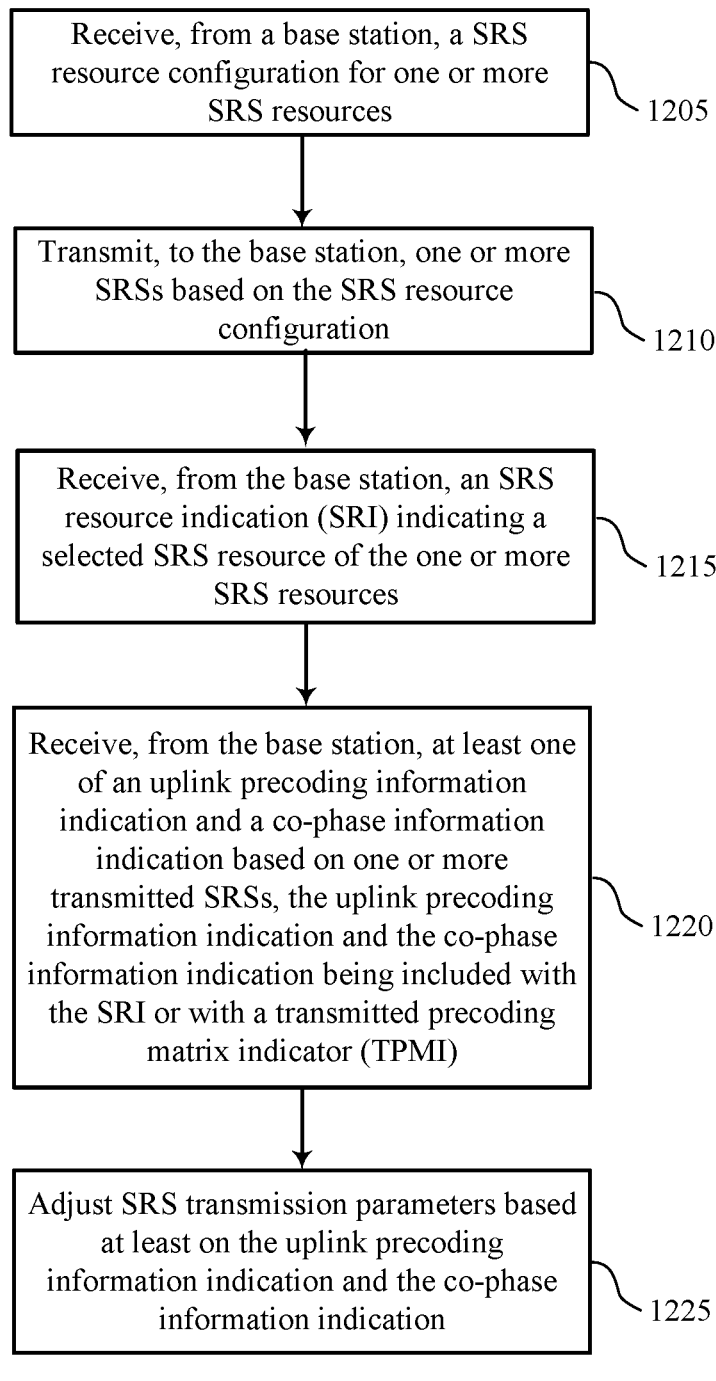
FIGS. 12 through 18 show flowcharts illustrating methods that support configuration of SRS resource(s) for multi-panel uplink transmission in accordance with aspects of the present disclosure.

FIG. 12 shows a flowchart illustrating a method 1200 that supports configuration of SRS resource(s) for multi-panel uplink transmission in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein.

Additionally or alternatively, a UE may perform aspects of the functions described herein using special-purpose hardware.

At 1205, the UE may receive, from a base station, an SRS resource configuration for one or more SRS resources. The operations of 1205 may be performed according to the methods described herein. In some examples, aspects of the operations of 1205 may be performed by an SRS resource configuration manager as described with reference to FIGS. 4 through 7.

At 1210, the UE may transmit, to the base station, one or more SRSs based on the SRS resource configuration. The operations of 1210 may be performed according to the methods described herein. In some examples, aspects of the operations of 1210 may be performed by an SRS manager as described with reference to FIGS. 4 through 7.

At 1215, the UE may receive, from the base station, an SRS resource indication (SRI) indicating a selected SRS resource of the one or more SRS resources. The operations of 1215 may be performed according to the methods described herein. In some examples, aspects of the operations of 1215 may be performed by a transmission parameter manager as described with reference to FIGS. 4 through 7.

At 1220, the UE may receive, from the base station, at least one of an uplink precoding information indication and a co-phase information indication based on the one or more transmitted SRSs, the uplink precoding information indication and the co-phase information indication being included with the SRI or with a transmitted precoding matrix indicator (TPMI). The operations of 1220 may be performed according to the methods described herein. In some examples, aspects of the operations of 1220 may be performed by a transmission parameter manager as described with reference to FIGS. 4 through 7.

At 1225, the UE may adjust SRS transmission parameters based at least on the uplink precoding information indication and the co-phase information indication. The operations of 1225 may be performed according to the methods described herein. In some examples, aspects of the operations of 1225 may be performed by a transmission parameter manager as described with reference to FIGS. 4 through 7.

Figure 13:
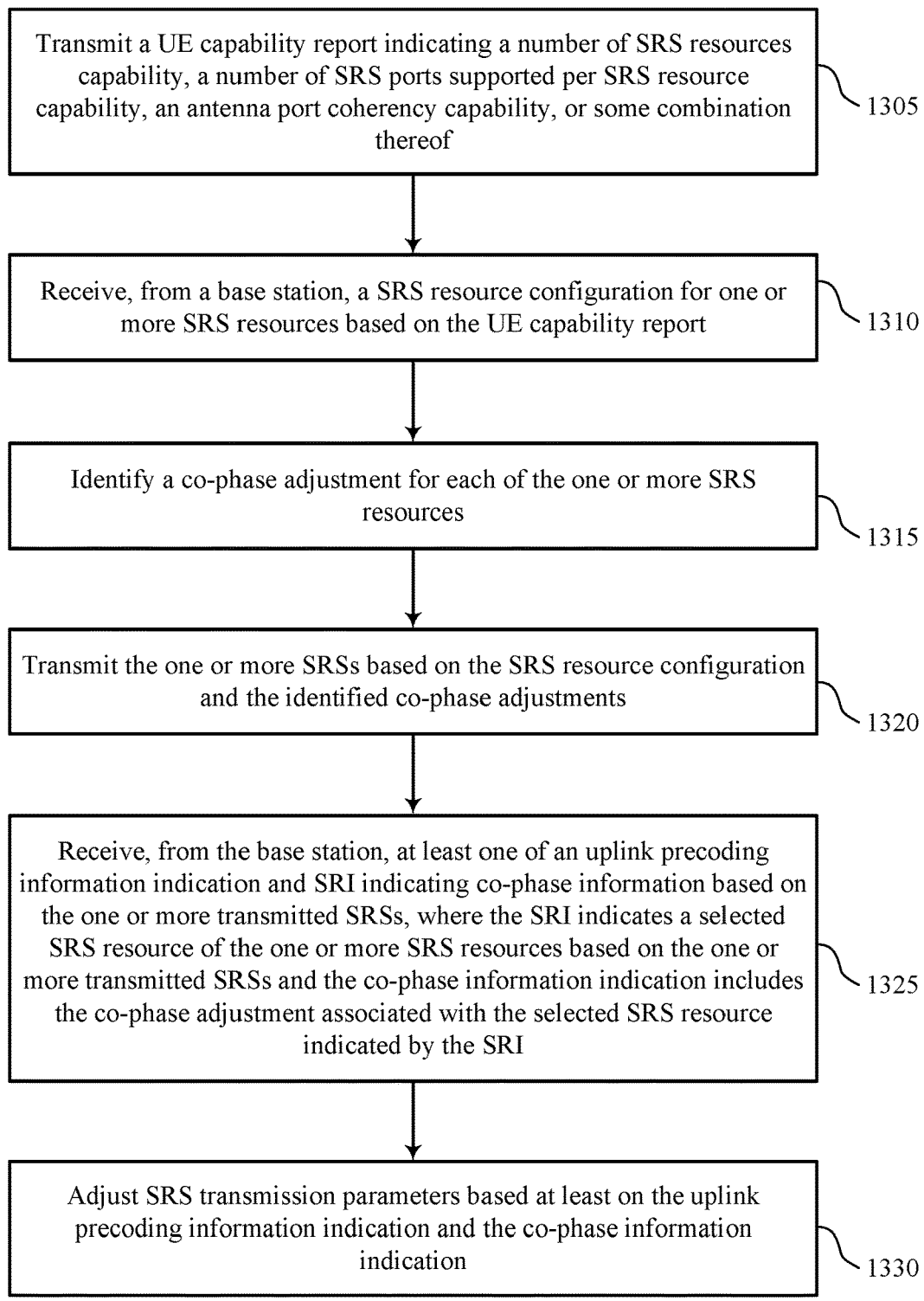

FIG. 13 shows a flowchart illustrating a method 1300 that supports configuration of SRS resource(s) for multi-panel uplink transmission in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may transmit a UE capability report indicating a number of SRS resources capability, a number of SRS ports supported per SRS resource capability, an antenna port coherency capability, or some combination thereof. The operations of 1305 may be performed according to the methods described herein. In some examples, aspects of the operations of 1305 may be performed by an SRS resource configuration manager as described with reference to FIGS. 4 through 7.

At 1310, the UE may receive, from a base station, an SRS resource configuration for one or more SRS resources. In some cases, the SRS resource configuration is based on the transmitted UE capability report. The operations of 1310 may be performed according to the methods described herein. In some examples, aspects of the operations of 1310 may be performed by an UE capability manager as described with reference to FIGS. 4 through 7.

At 1315, the UE may identify a co-phase adjustment for each of the one or more SRS resources. The operations of 1315 may be performed according to the methods described herein. In some examples, aspects of the operations of 1315 may be performed by a co-phase manager as described with reference to FIGS. 4 through 7.

At 1320, the UE may transmit the one or more SRSs based on the SRS resource configuration and the identified co-phase adjustments. For example, the UE may transmit SRS on each of the SRS resources indicated by the SRS resource configuration, and may adjust the co-phase for each SRS transmission based on the identified co-phase adjustments. The operations of 1320 may be performed according to the methods described herein. In some examples, aspects of the operations of 1320 may be performed by a transmission parameter manager as described with reference to FIGS. 4 through 7.

At 1325, the UE may receive, from the base station, at least one of an uplink precoding information indication and SRI indicating co-phase information based on the one or more transmitted SRSs, where the SRI indicates a selected SRS resource of the one or more SRS resources based on the one or more transmitted SRSs and the co-phase information indication includes the co-phase adjustment associated with the selected SRS resource indicated by the SRI. The operations of 1325 may be performed according to the methods described herein. In some examples, aspects of the operations of 1325 may be performed by a co-phase manager as described with reference to FIGS. 4 through 7.

At 1330, the UE may adjust SRS transmission parameters based at least on the uplink precoding information indication and the co-phase information indication. The operations of 1330 may be performed according to the methods described herein. In some examples, aspects of the operations of 1330 may be performed by a transmission parameter manager as described with reference to FIGS. 4 through 7.

Figure 14:
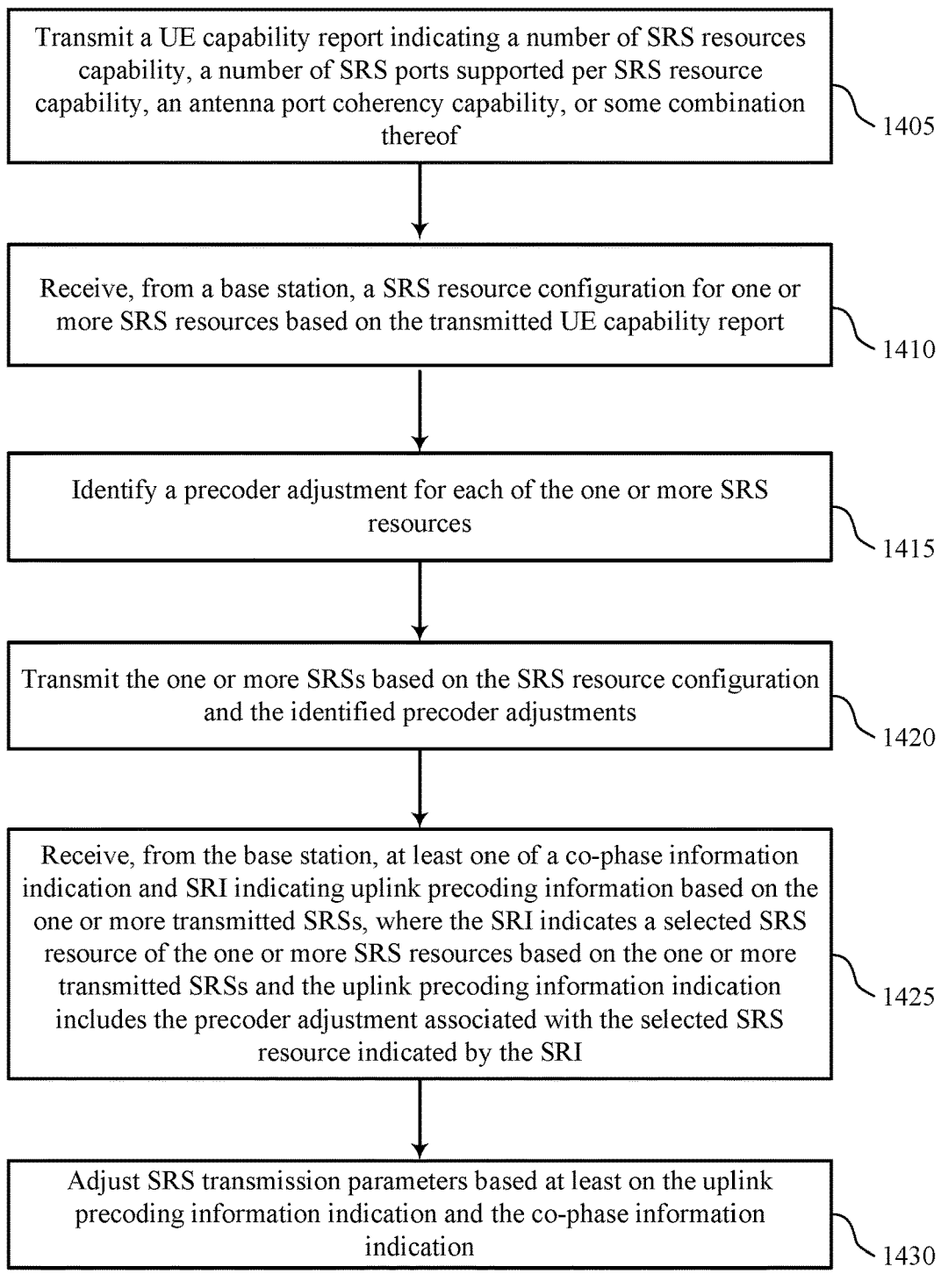

FIG. 14 shows a flowchart illustrating a method 1400 that supports configuration of SRS resource(s) for multi-panel uplink transmission in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1405, the UE may transmit a UE capability report indicating a number of SRS resources capability, a number of SRS ports supported per SRS resource capability, an antenna port coherency capability, or some combination thereof. The operations of 1405 may be performed according to the methods described herein. In some examples, aspects of the operations of 1405 may be performed by an SRS resource configuration manager as described with reference to FIGS. 4 through 7.

At 1410, the UE may receive, from a base station, an SRS resource configuration for one or more SRS resources. In some cases, the SRS resource configuration is based on the transmitted UE capability report. The operations of 1410 may be performed according to the methods described herein. In some examples, aspects of the operations of 1410 may be performed by an UE capability manager as described with reference to FIGS. 4 through 7.

At 1415, the UE may identify a precoder adjustment for each of the one or more SRS resources. The operations of 1415 may be performed according to the methods described herein. In some examples, aspects of the operations of 1415 may be performed by a precoding manager as described with reference to FIGS. 4 through 7.

At 1420, the UE may transmit the one or more SRSs based on the SRS resource configuration and the identified precoder adjustments. For example, the UE may transmit SRS on each of the SRS resources indicated by the SRS resource configuration, and may adjust the uplink precoding (e.g., the precoder) for each SRS transmission based on the identified precoder adjustments. The operations of 1420 may be performed according to the methods described herein. In some examples, aspects of the operations of 1420 may be performed by a transmission parameter manager as described with reference to FIGS. 4 through 7.

At 1425, the UE may receive, from the base station, at least one of a co-phase information indication and SRI indicating uplink precoding information based on the one or more transmitted SRSs, where the SRI indicates a selected SRS resource of the one or more SRS resources based on the one or more transmitted SRSs and the uplink precoding information indication includes the precoder adjustment associated with the selected SRS resource indicated by the SRI. The operations of 1425 may be performed according to the methods described herein. In some examples, aspects of the operations of 1425 may be performed by a transmission parameter manager as described with reference to FIGS. 4 through 7.

At 1430, the UE may adjust SRS transmission parameters based at least on the uplink precoding information indication and the co-phase information indication. The operations of 1430 may be performed according to the methods described herein. In some examples, aspects of the operations of 1430 may be performed by a transmission parameter manager as described with reference to FIGS. 4 through 7.

Figure 15:
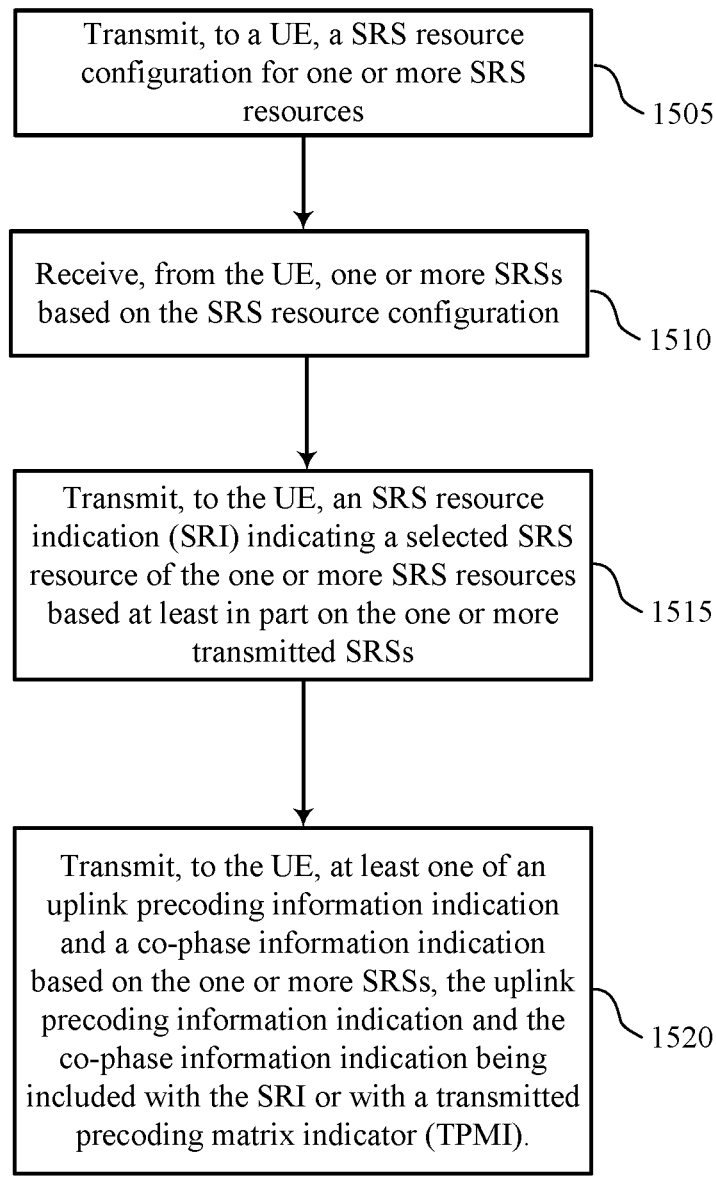

FIG. 15 shows a flowchart illustrating a method 1500 that supports configuration of SRS resource(s) for multi-panel uplink transmission in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1505, the base station may transmit, to a UE, an SRS resource configuration for one or more SRS resources. The operations of 1505 may be performed according to the methods described herein. In some examples, aspects of the operations of 1505 may be performed by an SRS resource configuration manager as described with reference to FIGS. 8 through 11.

At 1510, the base station may receive, from the UE, one or more SRSs based on the SRS resource configuration. The operations of 1510 may be performed according to the methods described herein. In some examples, aspects of the operations of 1510 may be performed by an SRS manager as described with reference to FIGS. 8 through 11.

At 1515, the base station may transmit, to the UE, an SRS resource indication (SRI) indicating a selected SRS resource of the one or more SRS resources based at least in part on the one or more transmitted SRSs. The operations of 1515 may be performed according to the methods described herein. In some examples, aspects of the operations of 1515 may be performed by a transmission parameter manager as described with reference to FIGS. 8 through 11.

At 1520, the base station may transmit, to the UE, at least one of an uplink precoding information indication and a co-phase information indication based on the one or more SRSs, the uplink precoding information indication and the co-phase information indication being included with the SRI or with a transmitted precoding matrix indicator (TPMI). The operations of 1520 may be performed according to the methods described herein. In some examples, aspects of the operations of 1520 may be performed by a transmission parameter manager as described with reference to FIGS. 8 through 11.

Figure 16:
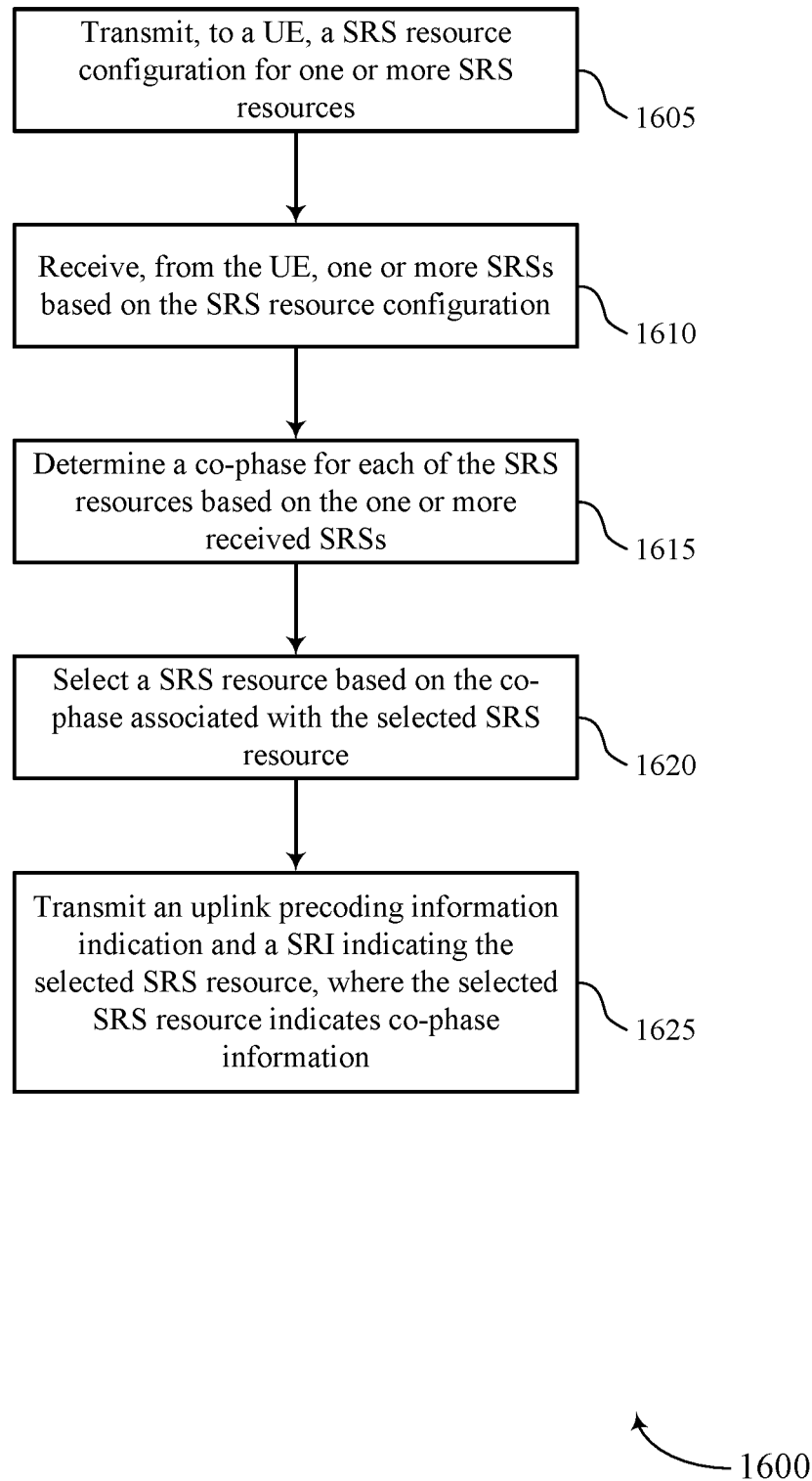

FIG. 16 shows a flowchart illustrating a method 1600 that supports configuration of SRS resource(s) for multi-panel uplink transmission in accordance with aspects of the present disclosure. The operations of method 1600 may be implemented by a base station 105 or its components as described herein. For example, the operations of method 1600 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1605, the base station may transmit, to a UE, an SRS resource configuration for one or more SRS resources. The operations of 1605 may be performed according to the methods described herein. In some examples, aspects of the operations of 1605 may be performed by an SRS resource configuration manager as described with reference to FIGS. 8 through 11.

At 1610, the base station may receive, from the UE, one or more SRSs based on the SRS resource configuration. The operations of 1610 may be performed according to the methods described herein. In some examples, aspects of the operations of 1610 may be performed by an SRS manager as described with reference to FIGS. 8 through 11.

At 1615, the base station may determine a co-phase for each of the SRS resources based on the one or more received SRSs. The operations of 1615 may be performed according to the methods described herein. In some examples, aspects of the operations of 1615 may be performed by a co-phase manager as described with reference to FIGS. 8 through 11.

At 1620, the base station may select an SRS resource based on the co-phase associated with the selected SRS resource. The operations of 1620 may be performed according to the methods described herein. In some examples, aspects of the operations of 1620 may be performed by an SRS manager as described with reference to FIGS. 8 through 11.

At 1625, the base station may transmit an uplink precoding information indication (e.g., based on the received one or more SRSs) and an SRI indicating the selected SRS resource, where the selected SRS resource indicates co-phase information. The operations of 1625 may be performed according to the methods described herein. In some examples, aspects of the operations of 1625 may be performed by a transmission parameter manager as described with reference to FIGS. 8 through 11.

At 1630, the base station may transmit, to the UE, at least one of an uplink precoding information indication and a co-phase information indication, the uplink precoding information indication and the co-phase information indication being based on the one or more SRSs. The operations of 1630 may be performed according to the methods described herein. In some examples, aspects of the operations of 1630 may be performed by a transmission parameter manager as described with reference to FIGS. 8 through 11.

Figure 17:
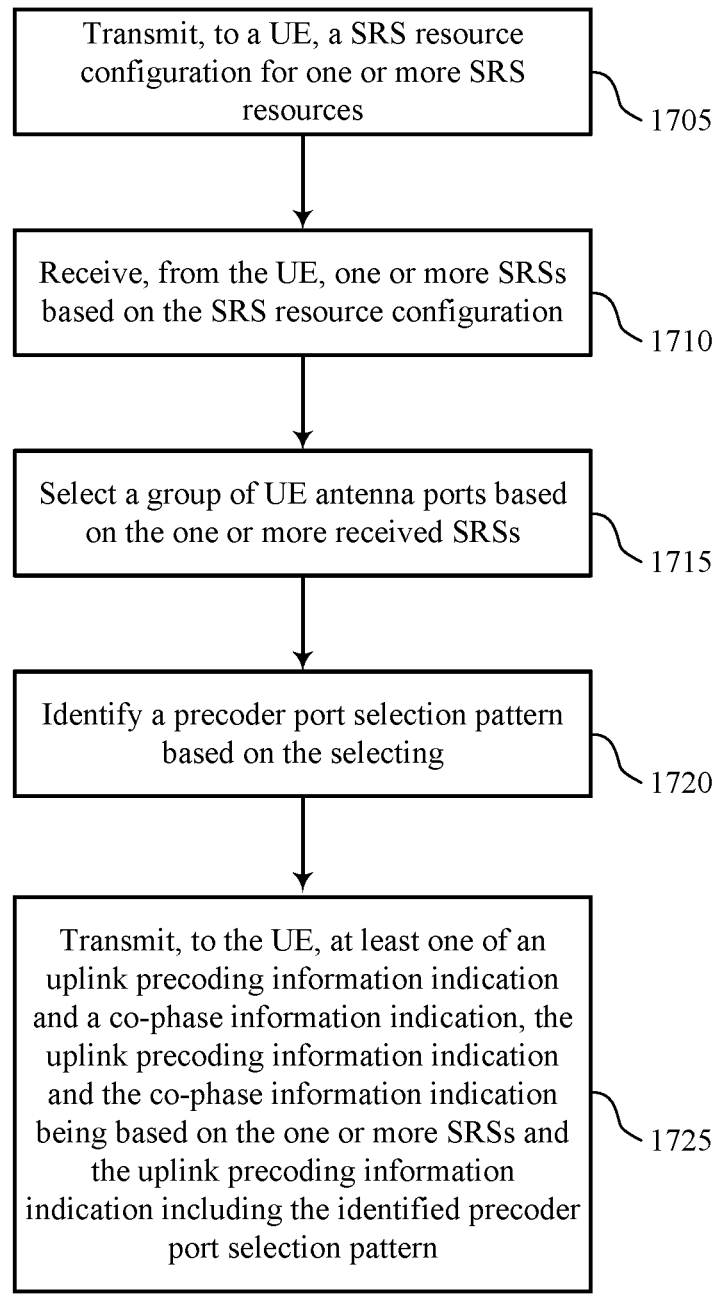

FIG. 17 shows a flowchart illustrating a method 1700 that supports configuration of SRS resource(s) for multi-panel uplink transmission in accordance with aspects of the present disclosure. The operations of method 1700 may be implemented by a base station 105 or its components as described herein. For example, the operations of method 1700 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1705, the base station may transmit, to a UE, an SRS resource configuration for one or more SRS resources. The operations of 1705 may be performed according to the methods described herein. In some examples, aspects of the operations of 1705 may be performed by an SRS resource configuration manager as described with reference to FIGS. 8 through 11.

At 1710, the base station may receive, from the UE, one or more SRSs based on the SRS resource configuration. The operations of 1710 may be performed according to the methods described herein. In some examples, aspects of the operations of 1710 may be performed by an SRS manager as described with reference to FIGS. 8 through 11.

At 1715, the base station may select a group of UE antenna ports based on the one or more received SRSs. The operations of 1715 may be performed according to the methods described herein. In some examples, aspects of the operations of 1715 may be performed by an SRS manager as described with reference to FIGS. 8 through 11.

At 1720, the base station may identify a precoder port selection pattern based on the selecting. The operations of 1720 may be performed according to the methods described herein. In some examples, aspects of the operations of 1720 may be performed by a precoding manager as described with reference to FIGS. 8 through 11.

At 1725, the base station may transmit, to the UE, at least one of an uplink precoding information indication and a co-phase information indication, the uplink precoding information indication and the co-phase information indication being based on the one or more SRSs and the uplink precoding information indication including the identified precoder port selection pattern. The operations of 1725 may be performed according to the methods described herein. In some examples, aspects of the operations of 1725 may be performed by a transmission parameter manager as described with reference to FIGS. 8 through 11.

Figure 18:
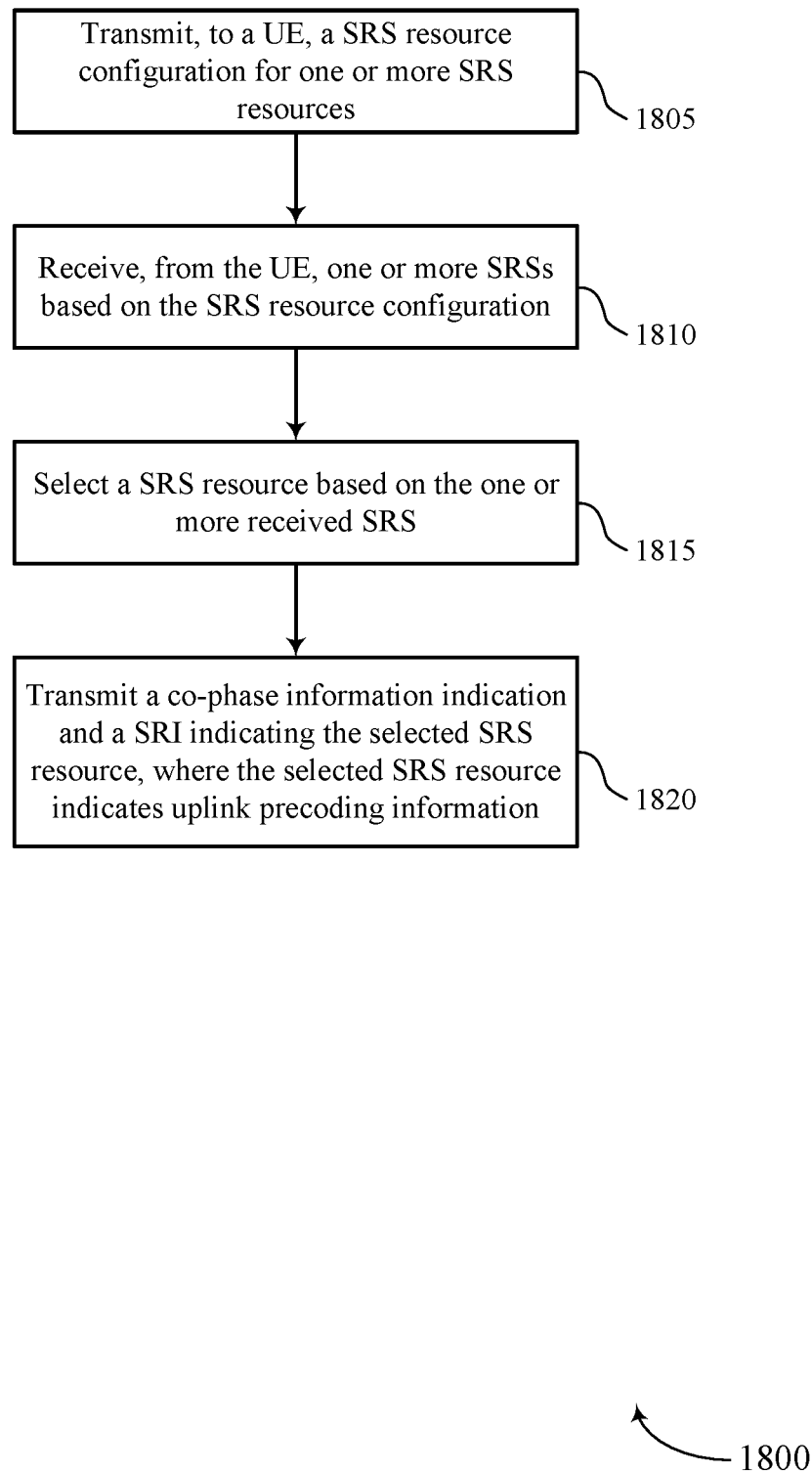

FIG. 18 shows a flowchart illustrating a method 1800 that supports configuration of SRS resource(s) for multi-panel uplink transmission in accordance with aspects of the present disclosure. The operations of method 1800 may be implemented by a base station 105 or its components as described herein. For example, the operations of method 1800 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1805, the base station may transmit, to a UE, an SRS resource configuration for one or more SRS resources. The operations of 1805 may be performed according to the methods described herein. In some examples, aspects of the operations of 1805 may be performed by an SRS resource configuration manager as described with reference to FIGS. 8 through 11.

At 1810, the base station may receive, from the UE, one or more SRSs based on the SRS resource configuration. The operations of 1810 may be performed according to the methods described herein. In some examples, aspects of the operations of 1810 may be performed by an SRS manager as described with reference to FIGS. 8 through 11.

At 1815, the base station may select an SRS resource based on the one or more received SRS. The operations of 1815 may be performed according to the methods described herein. In some examples, aspects of the operations of 1815 may be performed by an SRS manager as described with reference to FIGS. 8 through 11.

At 1820, the base station may transmit a co-phase information indication and an SRI indicating the selected SRS resource, where the selected SRS resource indicates uplink precoding information. The operations of 1820 may be performed according to the methods described herein. In some examples, aspects of the operations of 1820 may be performed by a transmission parameter manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies.

While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations described herein are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, from an access network entity, a sounding reference signal (SRS) resource configuration for one or more SRS resources;
    transmitting, to the access network entity, one or more SRSs based on the SRS resource configuration and a respective co-phase adjustment associated with each respective SRS resource of the one or more SRS resources;
    receiving, from the access network entity, an SRS resource indication (SRI) indicating a particular SRS resource of the one or more SRS resources based on the one or more transmitted SRSs, the SRI including a co-phase information indication corresponding to a particular co-phase adjustment associated with the particular SRS resource;
    receiving, from the access network entity, a transmitted precoding matrix indicator (TPMI), wherein the TPMI includes an uplink precoding information indication based on the one or more transmitted SRSs; and
    adjusting SRS transmission parameters based on the uplink precoding information indication or the co-phase information indication.

2. The method of claim 1, further comprising:
    identifying the respective co-phase adjustment associated with each respective SRS resource of the one or more SRS resources.

3. The method of claim 1, further comprising:
    determining, based on the uplink precoding information indication, a precoding matrix, a number of physical uplink shared channel (PUSCH) transmission layers, a subset of antenna ports for PUSCH transmission, or a combination thereof.

4. The method of claim 3, wherein the uplink precoding information indication includes a precoder port pattern indicating the subset of antenna ports for PUSCH transmission.

5. The method of claim 1, further comprising:
    identifying a respective precoder adjustment for each respective SRS resource of the one or more SRS resources, wherein transmitting the one or more SRSs comprises transmitting the one or more SRSs based on the respective precoder adjustment for each respective SRS resource of the one or more SRS resources.

6. The method of claim 5, wherein the SRI further indicates a particular precoder adjustment associated with the particular SRS resource indicated by the SRI.

7. The method of claim 5, further comprising:
    determining, based on the SRI, a number of physical uplink shared channel (PUSCH) transmission layers, wherein the number of PUSCH transmission layers is equal to a number of SRS resources indicated in the SRI.

8. The method of claim 1, further comprising:
    transmitting a UE capability report indicating a number of SRS resources capability, a number of SRS ports supported per SRS resource capability, an antenna port coherency capability, or a combination thereof, wherein the SRS resource configuration is based on the transmitted UE capability report.

9. A method for wireless communication at an access network entity, comprising:
    transmitting, to a user equipment (UE), a sounding reference signal (SRS) resource configuration for one or more SRS resources;
    receiving, from the UE, one or more SRSs based on the SRS resource configuration;
    transmitting, to the UE, an SRS resource indication (SRI) indicating a particular SRS resource of the one or more SRS resources based on the one or more received SRSs, the SRI including a co-phase information indication corresponding to a particular co-phase associated with the particular SRS resource; and
    transmitting, to the UE, a transmitted precoding matrix indicator (TPMI), wherein the TPMI includes an uplink precoding information indication based on the one or more SRSs.

10. The method of claim 9, further comprising:
    determining a respective co-phase associated with each respective SRS resource of the one or more SRS resources based on the one or more received SRSs; and
    selecting the particular SRS resource based on the particular co-phase associated with the particular SRS resource.

11. The method of claim 9, further comprising:
    selecting a group of UE antenna ports based on the one or more received SRSs;
    identifying a precoder port pattern based on the selection; and
    transmitting the uplink precoding information indication, wherein the uplink precoding information indication comprises the identified precoder port pattern.

12. The method of claim 9, further comprising:
    receiving a UE capability report indicating a number of SRS resources capability, a number of SRS ports supported per SRS resource capability, an antenna port coherency capability, or a combination thereof; and
    identifying the SRS resource configuration based on the received UE capability report.

13. A user equipment (UE) for wireless communication, comprising:
    a memory; and
    at least one processor coupled to the memory, wherein the one processor is configured to:
        receive, from an access network entity, a sounding reference signal (SRS) resource configuration for one or more SRS resources;
        transmit, to the access network entity, one or more SRSs based on the SRS resource configuration and a respective co-phase adjustment associated with each respective SRS resource of the one or more SRS resources;
        receive, from the access network entity, an SRS resource indication (SRI) indicating a particular SRS resource of the one or more SRS resources based on the one or more transmitted SRSs, the SRI including a co-phase information indication corresponding to a particular co-phase adjustment associated with the particular SRS resource;

receive, from the access network entity, a transmitted precoding matrix indicator (TPMI), wherein the TPMI includes an uplink precoding information indication based on the one or more transmitted SRSs; and adjust SRS transmission parameters based on the uplink precoding information indication or the co-phase information indication.

14. The UE of claim 13, wherein the at least one processor is configured to:
identify the respective co-phase adjustment associated with each respective SRS resource of the one or more SRS resources.

15. The apparatus UE of claim 13, wherein the at least one processor is configured to:
determine, based on the uplink precoding information indication, a precoding matrix, a number of physical uplink shared channel (PUSCH) transmission layers, a subset of antenna ports for PUSCH transmission, or a combination thereof.

16. The UE of claim 15, wherein the uplink precoding information indication includes a precoder port pattern indicating the subset of antenna ports for PUSCH transmission.

17. The UE of claim 13, wherein the at least one processor is configured to:
identify a respective precoder adjustment for each respective SRS resource of the one or more SRS resources, wherein to transmit the one or more SRSs is based on the respective precoder adjustment for each respective SRS resource of the one or more SRS resources.

18. The UE of claim 17, wherein
the SRI further indicates a particular precoder adjustment associated with the particular SRS resource indicated by the SRI.

19. The UE of claim 17, wherein the at least one processor is configured to:
determine, based on the SRI, a number of physical uplink shared channel (PUSCH) transmission layers, wherein the number of PUSCH transmission layers is equal to a number of SRS resources indicated in the SRI.

20. The UE of claim 13, wherein the at least one processor is configured to:
transmit a UE capability report indicating a number of SRS resources capability, a number of SRS ports supported per SRS resource capability, an antenna port coherency capability, or a combination thereof, wherein the SRS resource configuration is based on the transmitted UE capability report.

21. The UE of claim 13, wherein the uplink precoding information indication comprises an index of uplink precoding information and a number of layers.

22. The UE of claim 13, wherein each SRS resource of the one or more SRS resources comprises a plurality of antenna ports.

23. The UE of claim 13, wherein the uplink precoding information indication further indicates a number of layers.

24. An access network entity for wireless communication, comprising:
a memory; and
at least one processor coupled to the memory, wherein the one processor is configured to:
transmit, to a user equipment (UE), a sounding reference signal (SRS) resource configuration for one or more SRS resources;
receive, from the UE, one or more SRSs based on the SRS resource configuration;
transmit, to the UE, an SRS resource indication (SRI) indicating a particular SRS resource of the one or more SRS resources based on the one or more received SRSs, the SRI including a co-phase information indication corresponding to a particular co-phase associated with the particular SRS resource; and
transmit, to the UE, a transmitted precoding matrix indicator (TPMI), wherein the TPMI includes an uplink precoding information indication based on the one or more SRSs.

25. The access network entity of claim 24, wherein the one processor is configured to:
determine a respective co-phase associated with each SRS resource of the one or more SRS resources based on the one or more received SRSs; and
select the particular SRS resource based on the particular co-phase associated with the particular SRS resource.

26. The access network entity of claim 24, wherein the one processor is configured to:
select a group of UE antenna ports based on the one or more received SRSs; and
identify a precoder port pattern based on the selection.

27. The access network entity of claim 24, wherein the one processor is configured to:
receive a UE capability report indicating a number of SRS resources capability, a number of SRS ports supported per SRS resource capability, an antenna port coherency capability, or a combination thereof; and
identify the SRS resource configuration based on the received UE capability report.

28. The access network entity of claim 24, wherein the uplink precoding information indication comprises an index of uplink precoding information and a number of layers.

29. The access network entity of claim 24, wherein each SRS resource of the one or more SRS resources comprises a plurality of antenna ports.

30. The access network entity of claim 24, wherein the uplink precoding information indication further indicates a number of layers.

* * * * *